United States Patent
Tsukamoto et al.

(10) Patent No.: US 7,082,759 B1
(45) Date of Patent: Aug. 1, 2006

(54) HYDRAULIC DRIVE VEHICLE

(76) Inventors: Michio Tsukamoto, 2-18-1, Inadera, Amagasaki-shi, Hyogo (JP); Hideaki Okada, 2-18-1, Inadera, Amagasaki-shi, Hyogo (JP)

( * ) Notice: Subject to any disclaimer, the term of this patent is extended or adjusted under 35 U.S.C. 154(b) by 1 day.

(21) Appl. No.: 10/932,294

(22) Filed: Sep. 2, 2004

(51) Int. Cl.
*F16D 31/02* (2006.01)

(52) U.S. Cl. .......................... 60/456; 60/484

(58) Field of Classification Search ................. 60/456, 60/484; 91/499; 417/201, 269
See application file for complete search history.

(56) References Cited

U.S. PATENT DOCUMENTS

| | | | | |
|---|---|---|---|---|
| 3,480,099 A | * | 11/1969 | Hunck et al. .................. | 60/484 |
| 4,886,142 A | * | 12/1989 | Yamaoka et al. ............. | 60/484 |
| 5,622,051 A | * | 4/1997 | Iida et al. ...................... | 60/456 |
| 6,390,227 B1 | * | 5/2002 | Abend et al. .................. | 60/492 |
| 6,672,843 B1 | * | 1/2004 | Holder et al. .................. | 91/499 |
| 6,732,828 B1 | | 5/2004 | Abend et al. | |
| 6,736,605 B1 | * | 5/2004 | Ohashi et al. ................. | 60/484 |
| 6,772,591 B1 | * | 8/2004 | Ohashi et al. ................. | 60/484 |
| 6,953,327 B1 | * | 10/2005 | Hauser et al. ................. | 60/484 |

* cited by examiner

*Primary Examiner*—Edward K. Look
*Assistant Examiner*—Michael Leslie
(74) *Attorney, Agent, or Firm*—Sterne, Kessler, Goldstein & Fox P.L.L.C.

(57) ABSTRACT

A hydraulic driving vehicle comprises front and rear transaxles incorporating respective hydraulic motors, and a pump unit separated from the front and rear transaxles. The pump unit incorporates a hydraulic pump having a pump shaft. A hydraulic circuit is formed by piping between the pump unit and the front and rear transaxles so as to circulate hydraulic fluid between the hydraulic pump and the hydraulic motors. A reservoir tank of the hydraulic fluid is connected to the hydraulic circuit by piping. A first cooling fan blowing air away from the pump unit and a second cooling fan blowing air toward the pump unit are disposed oppositely to each other with respect to the pump unit and drivingly connected to the pump shaft. At least a pipe for the piping of the hydraulic circuit and the reservoir tank passes an area blown by each of the first and second cooling fans.

11 Claims, 27 Drawing Sheets

Fig. 1 5 (a)
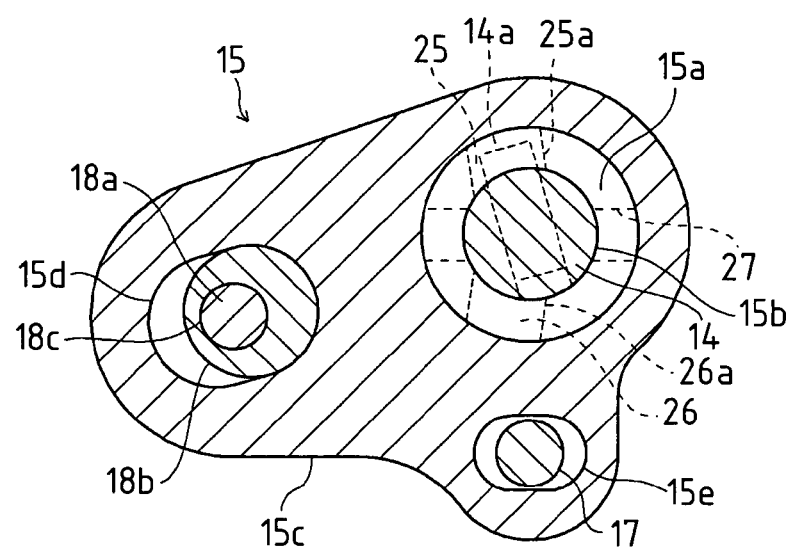

Fig. 24

|  | S 1 | | S 2 | |
|---|---|---|---|---|
| 10A / 10B | 10A | 10B | 10A | 10B |
| Motor Disp. | M 1 | M 3 | M 2 | M 3 |
| Motor shaft rpm | R 1 | R 3 | R 2 | R 3 |
| Gear Reduction Ratio | G 1 | G 3 | G 2 | G 3 |
| Wheel Speed | D 1 | D 3 | D 2 | D 3 |

|  | S 1 | | S 2 | |
|---|---|---|---|---|
|  | During Straight Traveling | During Turning | During Straight Traveling | During Turning |
| Motor Disp. | M 1 = M 3 | M 1 < M 3 | M 2 > M 3 | M 2 ≦ M 3 |
| Motor shaft rpm | R 1 = R 3 | R 1 > R 3 | R 2 < R 3 | R 2 ≧ R 3 |
| Gear Reduction Ratio | G 1 = G 3 | G 1 = G 3 | G 2 < G 3 | G 2 < G 3 |
| Wheel Speed | D 1 = D 3 | D 1 > D 3 | D 2 = D 3 | D 2 > D 3 |

HYDRAULIC DRIVE VEHICLE

BACKGROUND OF THE INVENTION

1. Field of the Invention

The invention relates to a hydraulic driving vehicle comprising a pair of front and rear transaxles incorporating respective hydraulic motors, supplied with hydraulic fluid through pipes from a pump unit separated from the transaxles.

2. Related Art

Conventionally, there is a well-known working vehicle having front and rear transaxles incorporating respective hydraulic motors, which are supplied with hydraulic fluid from a pump unit separated from the transaxles, as disclosed in U.S. Pat. No. 6,732,828. Pipes are interposed among the pump unit and the front and rear transaxles so as to form a hydraulic circuit for circulating hydraulic fluid between a hydraulic pump in the pump unit and the hydraulic motors in the transaxles.

Hydraulic fluid circulated in the hydraulic circuit is heated as much as its pressure loss. Therefore, a cooling fan is usually provided on a pump shaft of the hydraulic pump projecting outward from a casing of the pump unit so as to blow and cool the casing, thereby cooling the circulated hydraulic fluid.

However, the effect of cooling hydraulic fluid is insufficient because the cooling effect by the cooling fan is transmitted to the hydraulic fluid through the casing of the pump unit.

Further, conventionally, a reservoir tank is fluidly connected through a piping to the hydraulic circuit including the hydraulic pump and motors so as to absorb excessive hydraulic fluid. The problem of the reservoir tank is that the absorption of excessive fluid from any of the pump unit and transaxles interferes with flow of fluid through another of the pump unit and transaxles.

SUMMARY OF THE INVENTION

A first object of the present invention is to provide a hydraulic driving vehicle comprising front and rear transaxles incorporating respective hydraulic motors and a pump unit separated from the front and rear transaxles which are fluidly connected by piping so as to form a hydraulic circuit for circulating hydraulic fluid among a hydraulic pump in the pump unit and the hydraulic motors in the transaxles, a reservoir tank being fluidly connected to the hydraulic circuit by piping, wherein the effect of cooling the hydraulic fluid circulated in the hydraulic circuit is enhanced.

To achieve the first object, according to the present invention, the hydraulic driving vehicle comprises a first cooling fan drivingly connected to the pump shaft so as to blow air away from the pump unit, wherein at least one pipe for the piping of the hydraulic circuit and the reservoir tank passes an area blown by the first cooling fan so as to effectively cool the hydraulic fluid circulating in the hydraulic circuit.

Preferably, one of the front and rear transaxles is disposed within an area blown by air from the first cooling fan so as to enhance the effect of cooling the transaxle and hydraulic fluid in the hydraulic circuit.

Preferably, the hydraulic driving vehicle further comprises a second cooling fan drivingly connected to the pump shaft opposite to the first cooling fan with respect to the hydraulic pump, wherein the second cooling fan blows air toward the pump unit, and at least one pipe for the piping of the hydraulic circuit and the reservoir tank passes an area blown by the second cooling fan so as to enhance the effect of cooling the hydraulic fluid circulating in the hydraulic circuit.

Preferably, at least one pipe for the piping of the hydraulic circuit and the reservoir tank is partly or entirely made of metal material so as to be cooled effectively.

Preferably, the vehicle further comprises a hydraulic actuator and a pipe for piping the hydraulic actuator to the hydraulic circuit passes the area blown by the first or second cooling fan so as to effectively cool hydraulic fluid supplied to the hydraulic actuator.

A second object of the present invention is to provide a hydraulic driving vehicle comprising front and rear transaxles incorporating respective hydraulic motors to which a hydraulic pump separated from the front and rear transaxles is fluidly connected by piping so as to form a hydraulic circuit for circulating hydraulic fluid among the hydraulic pump and motors, wherein a reservoir tank is fluidly connected to the hydraulic circuit without excessive hydraulic fluid of any of the pump unit and transaxles in the hydraulic circuit interfering with hydraulic fluid flow of any of the hydraulic pump and motors.

To achieve the second object, according to the present invention, the front and rear transaxles and the pump unit are connected through respective separate pipes to the reservoir tank so as to return excessive fluid to the reservoir tank, whereby each of the hydraulic pump and motors is free of action from influence of fluid flow from any of the pump unit and transaxles to the reservoir tank.

These, other and further objects, features and advantages will appear more fully from the following description with reference to accompanying drawings.

BRIEF DESCRIPTION OF THE DRAWINGS

FIG. 7(*a*) is a sectional view of a neutral adjusting sleeve 42 and a shaft 41 therein.

FIG. 15(a) is a sectional front view (a) of shaft holder 15.

FIG. 24 is a table showing two motor setting patterns of transaxles 10A and 10B.

DETAILED DESCRIPTION OF THE INVENTION

Figure 1:
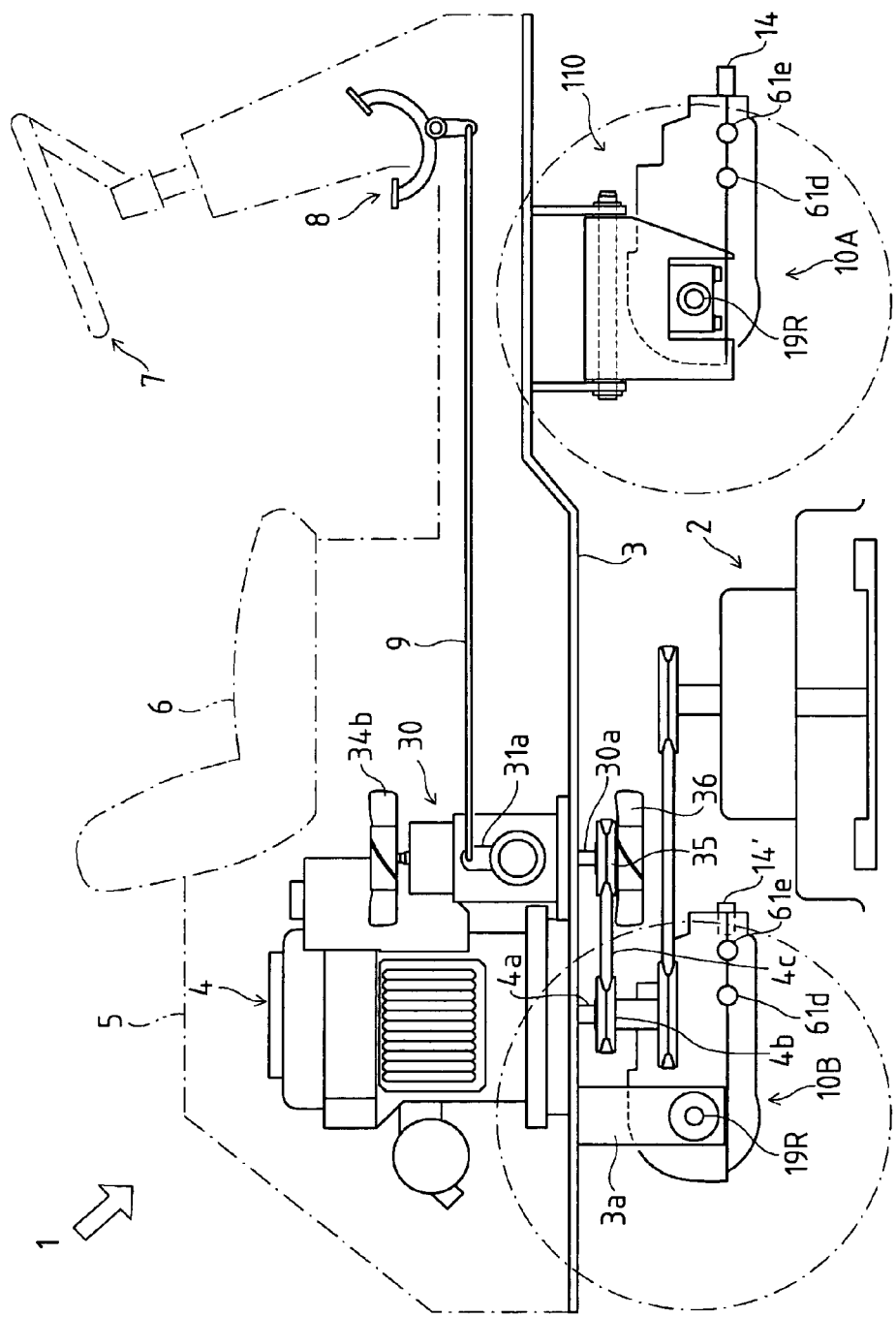
FIG. 1 is a schematic right side view of a riding lawn mower vehicle 1 serving as a hydraulic driving working vehicle according to an embodiment of the present invention.

Embodiments of a hydraulic driving working vehicle according to the present invention will be described.

Referring to a working vehicle 1 shown in FIGS. 1 and 2, a front transaxle 10A, a rear transaxle 10B, and a mower 2 between transaxles 10A and 10B are disposed below a chassis 3. Rear transaxle 10B is laterally eccentrically disposed in vehicle 1 so that left and right axles 19L and 19R projecting laterally outward from rear transaxle 10B are different in length from each other. Left and right brackets 3a holding respective bearings are hung down from chassis 3 so as to journal respective axles 19L and 19R through the respective bearings adjacent to rear tires on outer ends of axles 19L and 19R. Front transaxle 10A is suspended from chassis 3 as discussed later. An engine 4, and a pump unit 30 incorporating a hydraulic pump 33 driven by engine 4 are mounted on chassis 3. Engine 4 and pump unit 30 are enclosed in a bonnet 5 on which a driver's seat 6 is mounted.

A steering wheel 7 is disposed in front of seat 6, and a speed-controlling pedal 8 is disposed below steering wheel 7. Speed-controlling pedal 8 is operatively connected to a speed control lever 31a of pump unit 30 via a linkage 9 so as to change the variable displacement of hydraulic pump 33 in pump unit 30, thereby changing the traveling speed of working vehicle 1.

Figure 2:
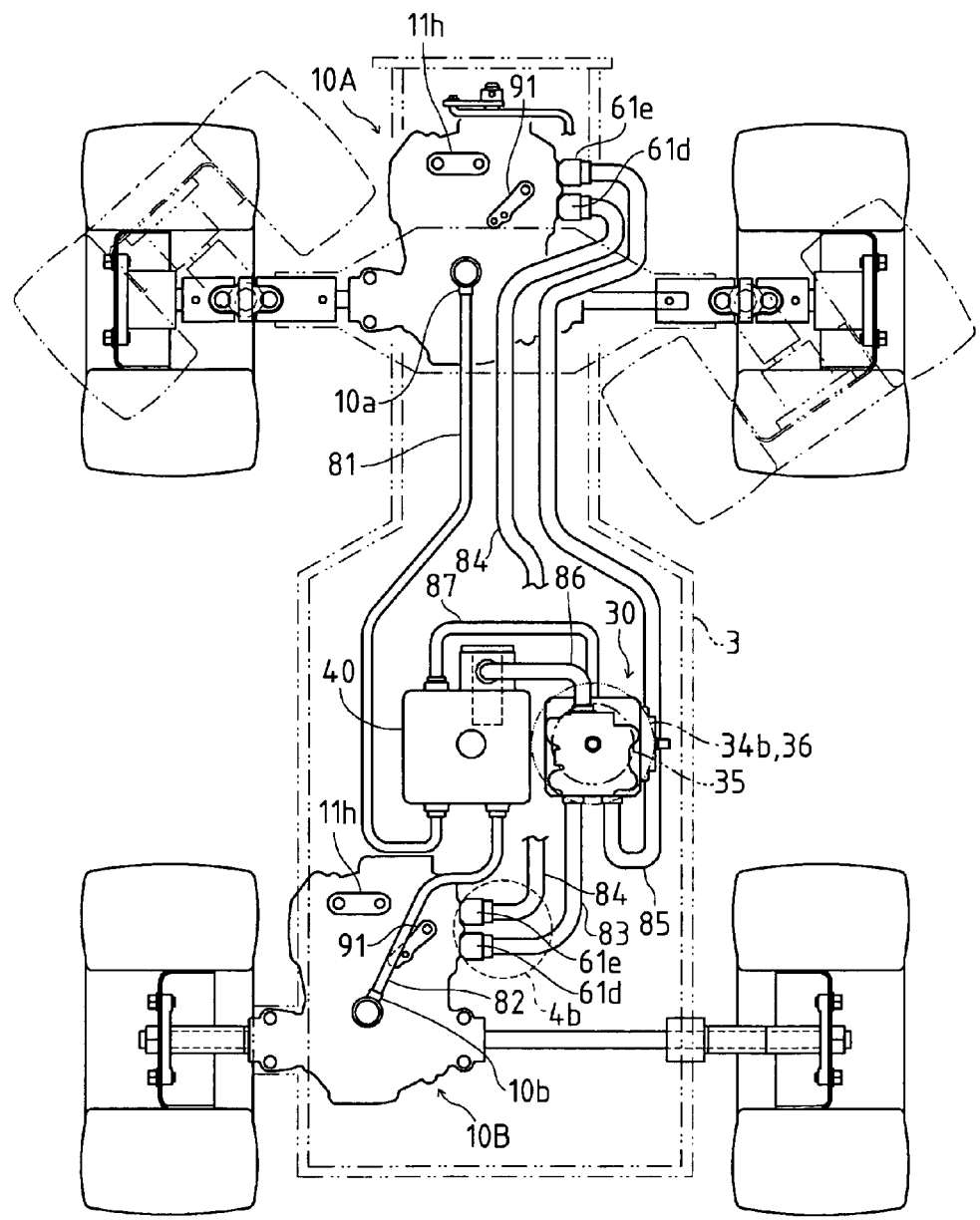
FIG. 2 is a schematic plan view of vehicle 1 showing a hydraulic circuit system with piping for driving vehicle 1 (the shown piping is so rearranged for convenience as to be different from its actual plan view).
Figure 3:
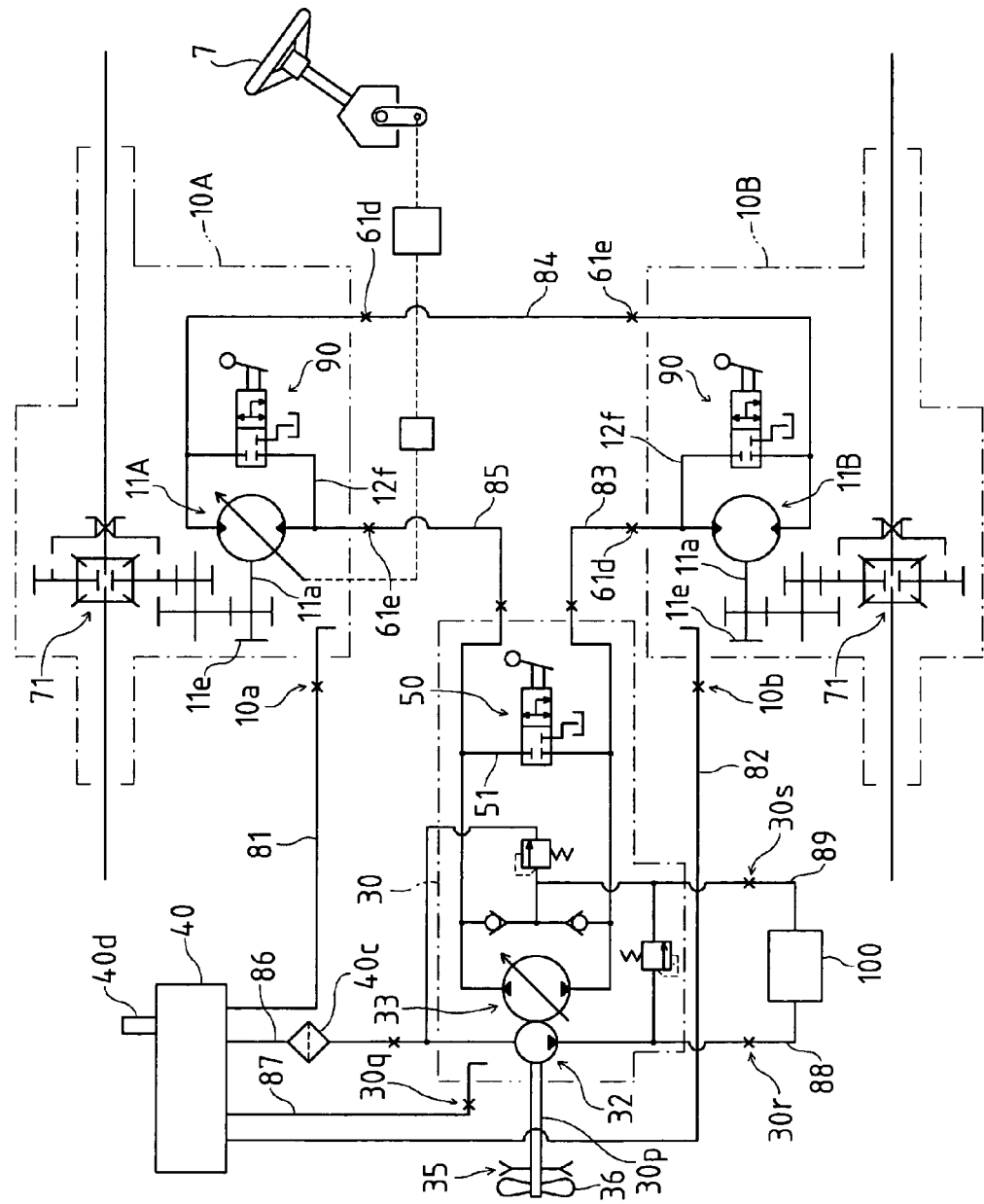
FIG. 3 is a diagram of the hydraulic circuit system.

Referring to FIG. 2, pump unit 30 and a reservoir tank 40 are disposed between front and rear transaxles 10A and 10B. Referring to FIGS. 2 and 3, pump unit 30 incorporates variable displacement hydraulic pump 33 shown in FIG. 3. Front transaxle 10A incorporates a front hydraulic motor 11A, and rear transaxle 10B a rear hydraulic motor 11B.

Alternatively, pump unit 30 may be disposed before front transaxle 10A or behind rear transaxle 10B. Alternatively, pump unit 30 may be disposed over or below the longer one of axles 19L and 19R of rear transaxle 10B disposed laterally eccentrically as mentioned above so that pump unit 30 and rear transaxle 10B are laterally juxtaposed between left and right brackets 3a. Pump unit 30 may be disposed at any place in vehicle 1 if the place is appropriate for avoiding interference with another part or member and for ensuring its proper driving connection with engine 4.

By piping among transaxles 10A and 10B and pump unit 30, a hydraulic circuit among hydraulic pump 33 and motors 11A and 11B is formed so as to connect hydraulic motors 11A and 11B in tandem to pump 33. When vehicle 1 travels forward, hydraulic fluid delivered from pump 33 flows through one of motors 11A and 11B, then flows through the other motor 11B or 11A, and returns to pump 33. In this way, the hydraulic fluid is circulated in the hydraulic circuit. When vehicle 1 travels backward, the hydraulic fluid flows in the hydraulic circuit in the opposite direction.

Pump unit 30 incorporates a charge pump 32 shown in FIG. 3 so as to charge hydraulic fluid from reservoir tank 40 into a higher pressured hydraulic fluid delivery passage in the hydraulic circuit.

Transaxles 10A and 10B have respective hydraulic fluid sumps therein, and have respective drain ports 10a and 10b open to the fluid sumps. A pipe 81 is interposed between drain port 10a of transaxle 10A and reservoir tank 40, and a pipe 82 between drain port 10b of transaxle 10B and reservoir tank 40, thereby draining excessive hydraulic fluid from respective transaxles 10A and 10B to reservoir tank 40.

In FIG. 1 illustrating entire vehicle 1, the piping among transaxles 10A and 10B and pump unit 30 for forming the HST circuit and to reservoir tank 40 is omitted.

Pump unit 30 has a drain port 30q shown in FIG. 3. A pipe 87 is interposed between drain port 30q and reservoir tank 40 so as to drain excessive hydraulic fluid from pump unit 30 to reservoir tank 40.

Pump unit 30 has a pair of PTO ports 30r and 30s, as shown in FIG. 3. A hydraulic actuator 100 such as a hydraulic cylinder for power steering or power lifting is optionally fluidly connected to the hydraulic circuit via pipes 88 and 89 coupled to respective PTO ports 30r and 30s.

A breather 40d is disposed on the top of reservoir tank 40 so as to release air from reservoir tank 40 to the atmosphere.

In this way, transaxles 10A and 10B and pump unit 30 are fluidly connected to reservoir tank 40 via respective separate pipes 81, 82 and 87, so that excessive hydraulic fluids from transaxles 10A and 10B and pump unit 30 directly flow into reservoir tank 40 independently of one another.

If the excessive hydraulic fluids from transaxles 10A and 10B and pump unit 30 were collected before flowing into reservoir tank 40, the resistance of the hydraulic fluid to flowing would increased so as to destabilize the flow of hydraulic fluid among transaxles 10A and 10B and pump unit 30, i.e., to hinder exact operations of hydraulic pump 33 and motors 11A and 11B. The above piping of separate pipes 81, 82 and 87 to reservoir tank 40 from respective transaxles 10A and 10B and pump unit 30 prevents hydraulic pump 33 and motors 11A and 11B from interfering with one another in operation, thereby ensuring exact operations of them.

Figure 5:
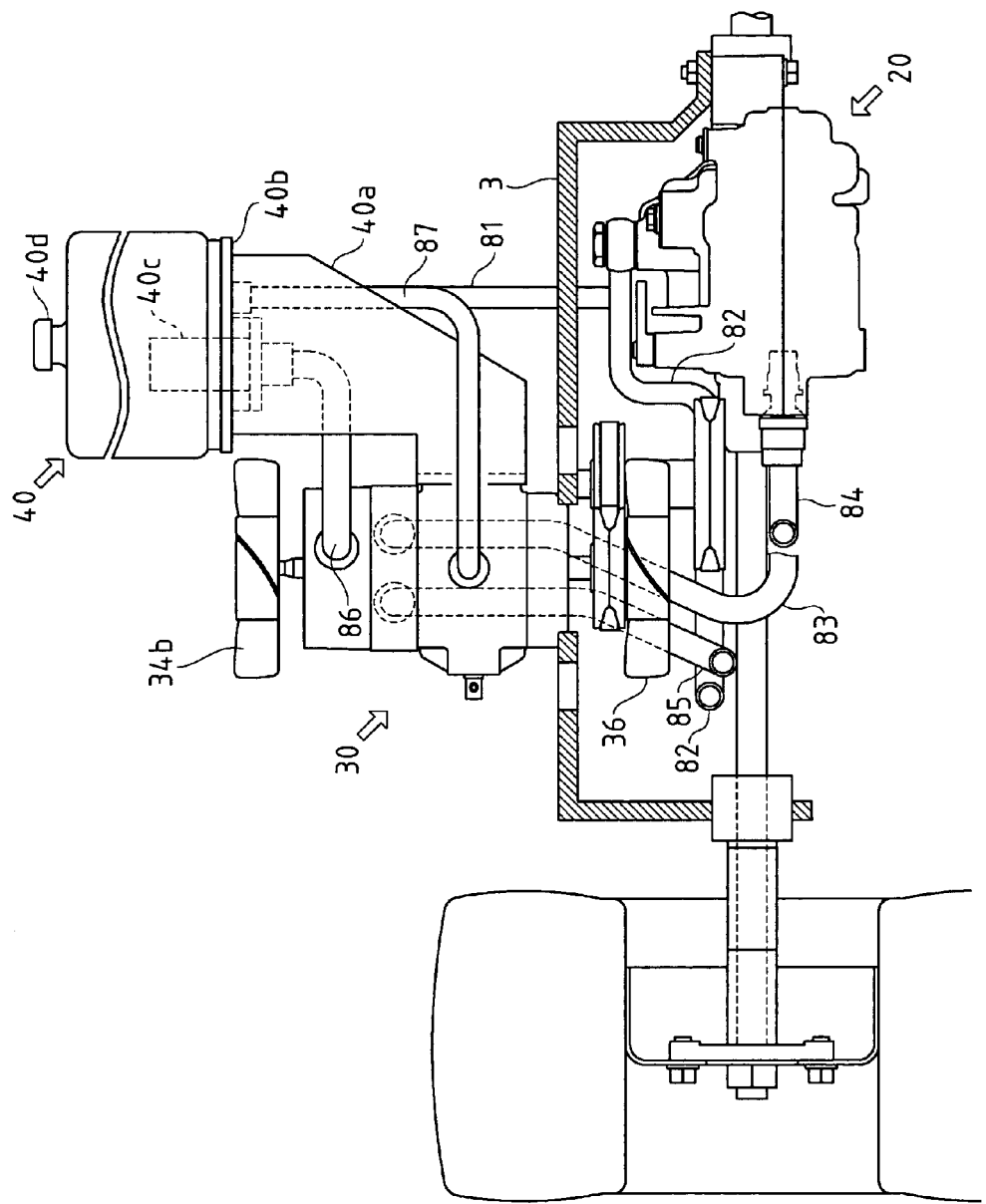
FIG. 5 is a sectional rear view of the same portion of vehicle 1 shown in FIG. 4.

Referring to FIG. 5, pipes 81, 82, 86 and 87 are extended or bent upward to connect at tops thereof to the bottom end of reservoir tank 40. Therefore, the top open ends of pipes 81, 82, 86 and 87 are constantly disposed below the level of hydraulic fluid in reservoir tank 40 so as to prevent the drained fluid from hitting the fluid level surface in the reservoir tank 40 causing air bubble in the fluid in the hydraulic circuit.

Referring to hydraulic fluid pipes shown in FIGS. 2 to 6, pipes 81 and 82 serve as drain passages from the respective hydraulic motor chambers of transaxles 10A and 10B to reservoir tank 40, as mentioned above. A pipe 83 is interposed between pump unit 30 and rear transaxle 10B. A pipe 84 is interposed between front and rear transaxles 10A and 10B. A pipe 85 is interposed between front transaxle 10A and pump unit 30. Each of pipes 81, 84 and 85 includes a rubber tube portion which is flexible and proof against high pressure of the hydraulic fluid.

Pipes 86 and 87 are interposed between pump unit 30 and reservoir tank 40. Pipe 86 connects charge pump 32 in pump unit 30 to reservoir tank 40 so as to charge a part of the hydraulic circuit in pump unit 30 with hydraulic fluid from reservoir tank 40. Pipe 87 is provided for draining hydraulic fluid from a fluid sump of pump unit 30 to reservoir tank 40.

Preferably, pipes 81 to 89 are partly or entirely made of metal material having effective radiation of heat from hydraulic fluid therein.

Figure 6:
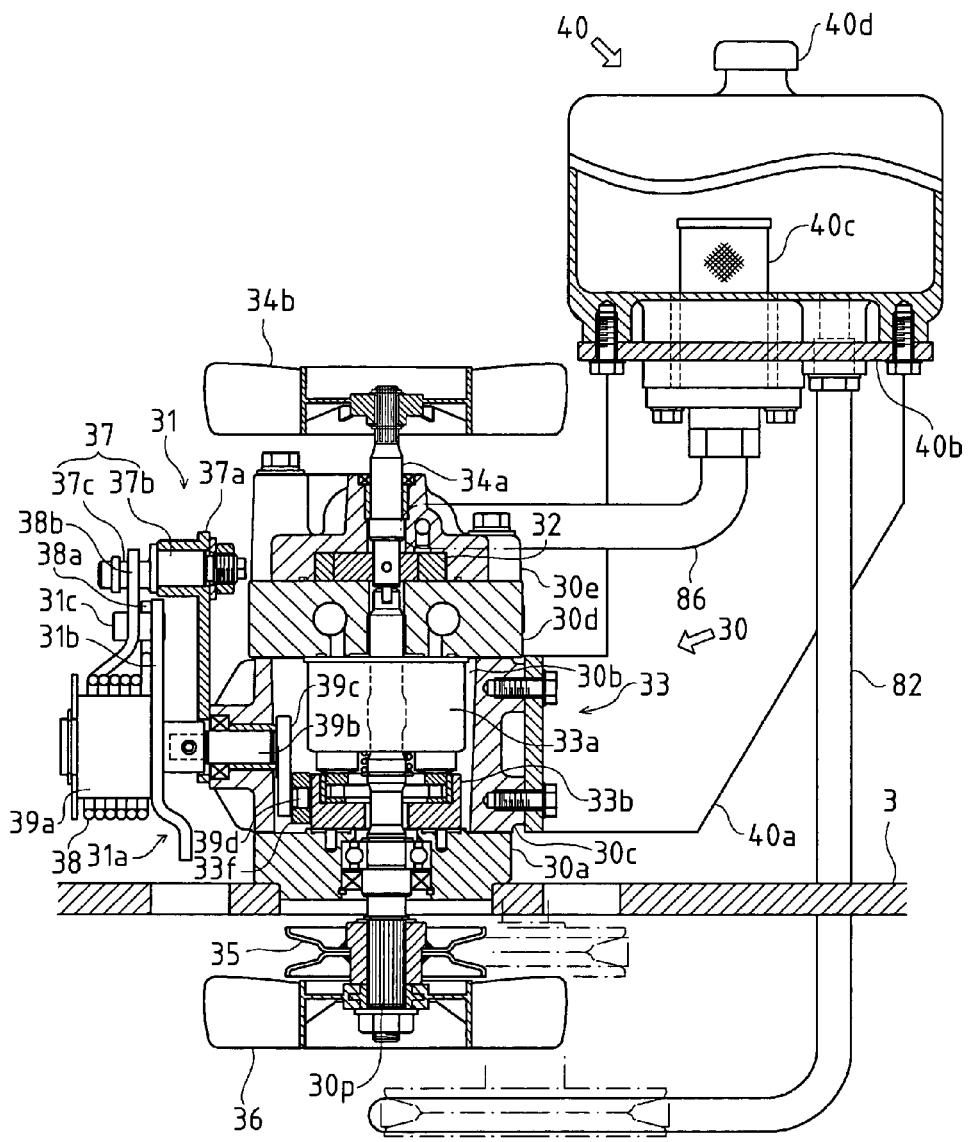
FIG. 6 is an enlarged rear view partly in section of the same portion of vehicle 1 shown in FIG. 4, showing pump unit 30 and reservoir tank 40.

Pump unit 30 uprightly mounted on chassis 3 will be described in accordance with FIGS. 4 to 6 and others. Referring to FIG. 6, a lower casing 30a is fixedly mounted upright on chassis 3 to rotatably support a vertical pump shaft 30p of hydraulic pump 33. A middle casing 30c, whose internal space serves as a pump chamber 30b for incorporating hydraulic pump 33, is fixedly mounted upright on lower casing 30a. A center section 30d formed therein with hydraulic fluid ducts is fixedly mounted upright on middle casing 30c. Upper casing 30e is fixedly mounted upright on center section 30d. Charge pump 32 is formed in upper casing 30e.

Variable displacement hydraulic pump 33 disposed in pump chamber 30b comprises a cylinder block 33a and a movable swash plate 33b. Speed-control lever 31a is provided on an outer side of middle casing 30c so as to change the tilt angle of swash plate 33b.

Vertical pump shaft 30p of hydraulic pump 33 is disposed at the top end thereof in center section 30d. A vertical pump shaft 34a of charge pump 32 in upper casing 30e just above center section 30d is extended downward so that coaxial pump shafts 30p and 34a integrally rotatably engage with each other in center section 30d. The top portion of charge pump shaft 34a projects upright from upper casing 30e so as to be fixedly provided thereon with a cooling fan 34b. Due to this construction, by rotating pump shaft 30p, cooling fan 34b rotates to blow air downward to pump unit 30 and pipes 83, 85, 86 and 87 connected to pump unit 30, as shown in FIG. 5.

Referring to FIG. 6, the bottom portion of pump shaft 30p projects downward from chassis 3 so as to be fixedly provided thereon with a pulley 35 and a cooling fan 36. As shown in FIG. 1, a driving belt 4c is interposed between pulley 35 and a pulley 4b fixed on an output shaft 4a of engine 4 so as to rotate pump shaft 30p by the power of engine 4.

Cooling fan 36 blows air downward to rear transaxle 10B and pipes 82, 83, 84 and 85 connected to rear transaxle 10B. Alternatively, cooling fan 36 may be provided on extended output shaft 4a of engine 4 if the effect of cooling all or a part of the pipes and rear transaxle 10B is ensured.

To sum up, pipes 82, 83, 84 and 85 connected to rear transaxle 10B pass an area blown by first cooling fan 36 drivingly connected to pump shaft 30p, and pipes 83, 85, 86 and 87 connected to pump unit 30 pass an area blown by second cooling fan 34b drivingly connected to pump shaft 30p opposite to first cooling fan 36 with respect to hydraulic motor 33. First cooling fan 36 blows air away from pump unit 30, and second cooling fan 34b toward pump unit 30. Such an arrangement of the pipes relative to opposite first and second cooling fans 36 and 34b effectively cools hydraulic fluid in the pipes, i.e., hydraulic fluid circulated among the hydraulic circuit of pump 33 and motors 11A and 11B.

Incidentally, at least one of pipes 88 and 89 between pump unit 30 and hydraulic actuator 100, as shown in FIG. 3, may also pass the area blown by the first or second cooling fan 36 or 34a so as to effectively cool hydraulic fluid supplied to hydraulic actuator 100.

Figure 4:
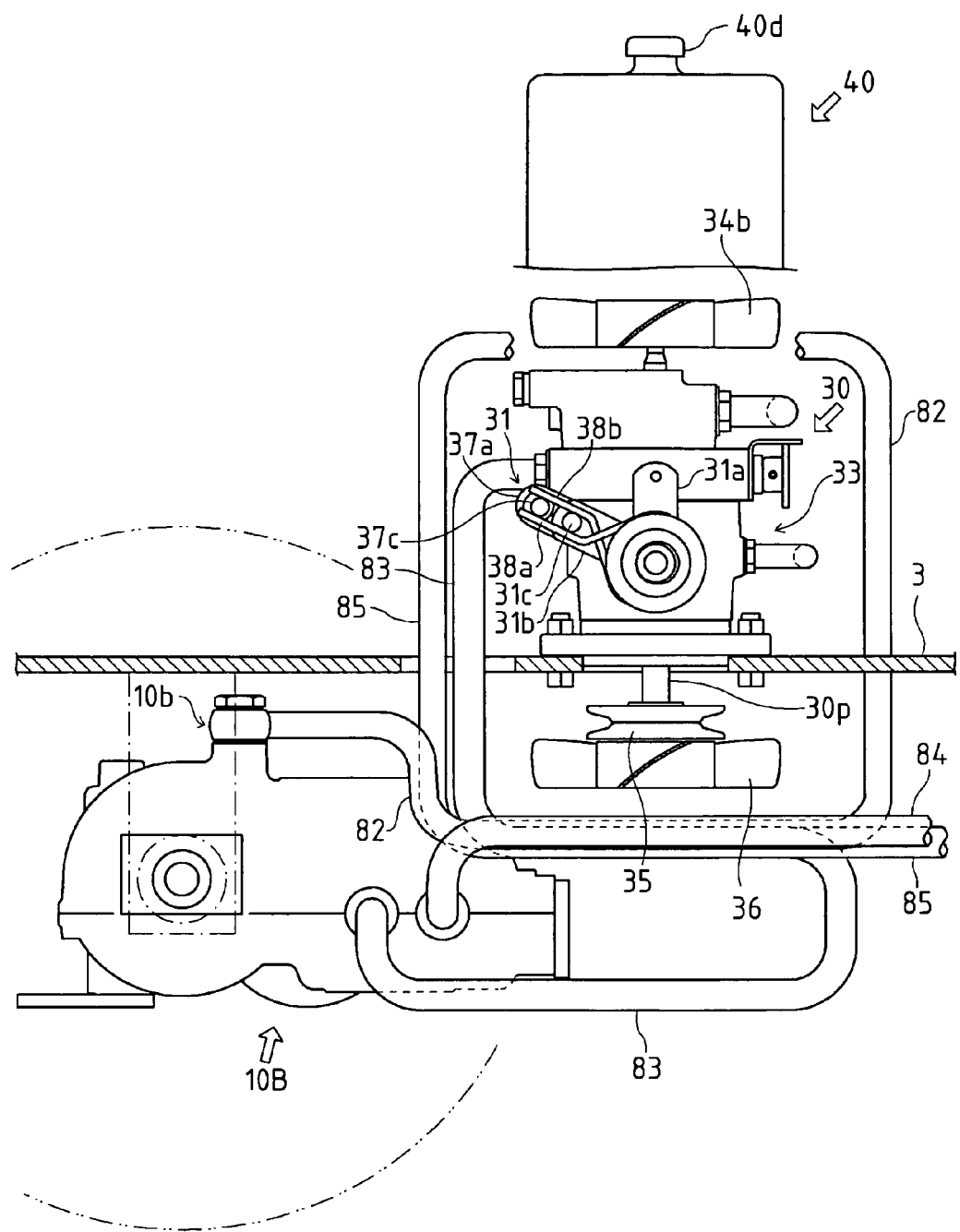
FIG. 4 is a sectional right side view of a portion of vehicle 1, showing a pump unit 30, a rear transaxle 10B and a reservoir tank 40 connected to each other by piping.

The arrangement of the pipes as shown in FIG. 4 is an example. Alternatively, all pipes 81 to 87 (shown in FIG. 2) may pass the area blown by either cooling fan 34b or 36.

Rear transaxle 10B is disposed in the area blown by cooling fan 36 on pump shaft 30p of pump unit 30, thereby being effectively cooled, and further facilitating for cooling hydraulic fluid in the hydraulic circuit. Alternatively, if pump unit 30 is disposed adjacent to front transaxle 10A, front transaxle 10A may be disposed in the area blown by cooling fan 36 (or 34b).

Alternatively, pump unit 30 may be disposed to orient pump shaft 30p horizontally, if it can be drivingly connected to engine 4 properly.

Referring to reservoir tank 40 as shown in FIG. 6, a stay 40a is fixed at a lower portion thereof to middle casing 30c, and has a top horizontal plate portion 40b on which reservoir tank 40 is mounted upright above cooling fan 34b. The above-mentioned pipes 81, 82 and 86 are connected upward to the bottom of reservoir tank 40 on top portion 40b of stay 40a. Referring to FIG. 6, reservoir tank 40 is provided with a filter 40c from which pipe 86 is extended to charge pump 32 in pump unit 30. Alternatively, stay 40a may be fixed to chassis 3 instead of middle casing 30c.

Illustrated reservoir tank 40 is integrated to pump unit 30 through stay 40a and disposed laterally adjacent to pump unit 30. Alternatively, reservoir tank 40 may be separated from pump unit 30. Any place in vehicle 1 may be allowed for arranging reservoir tank 40 if reservoir tank 40 can be disposed well without interfering with another member or part.

Further, the bottom of reservoir tank 40 to which top ends of pipes 81, 82 and 86 is connected is disposed higher than charge pump 32 so as to facilitate easy escape of air from the hydraulic fluid pipes into reservoir tank 40. Alternatively, reservoir tank 40 may be disposed as high as or slightly lower than charge pump 32 if such a high place cannot be provided for reservoir tank 40 and the force of charge pump 32 for circulating hydraulic fluid is sufficient to force air from hydraulic fluid circulating in the HST circuit into reservoir tank 40.

Referring to FIGS. 4 to 6, a neutral returning mechanism 31 for returning swash plate 3b to its neutral position (for stopping the delivery of hydraulic fluid by hydraulic pump 33) is disposed adjacent to control lever 31a. Control lever 31a has a branching second lever 31b from which a horizontal pin 31c projects. A neutral adjusting shaft 37 is planted into a stay 37a fixed onto an outer side end of middle casing 30c so as to project from stay 37a in parallel to pin 31c. A portion 37c of shaft 37 projecting from stay 37a is eccentric to the remaining portion 37b of shaft 37 in stay 37a. A nut is screwed on a threaded portion of shaft 37 projecting from stay 37a opposite to portion 37c so as to fasten shaft 37 to stay 37a. By loosening the nut, portion 37c is allowed to revolve around portion 37b so as to adjust the neutral position of control lever 31a in correspondence to the neutral position of swash plate 33b.

A horizontal speed-control shaft 39b is rotatably supported by middle casing 30c and projects out from middle casing 30c so as to be fixedly provided thereon with a cylinder 39a. Speed-control lever 31a is fixed at its basic portion onto cylinder 39a. A neutral returning spring 38 is coiled and retainer on cylinder 39a. Both end portions 38a and 38b of spring 38 are twisted to cross each other and extended in parallel so as to nip pin 31c and portion 37c of shaft 37 at their initial (neutral) positions.

Speed-control shaft 39b is fixed to one end of an arm 39c in pump chamber 30b enclosed by middle casing 30c. A fitting portion 39d formed on the other end of arm 39c is fitted to a fitting portion 33f of swash plate 33b.

Due to the above, depression of speed-control pedal 8 shown in FIG. 1 rotates speed-control lever 31a so as to rotate cylinder 39a, shaft 39b and arm 39c, thereby tilting swash plate 33b to a target position for determining amount and direction of hydraulic fluid delivered from hydraulic pump 33. Pin 31c rotating together with levers 31a and 31b by depression of pedal 8 pushes one of end portions 38a and 38b of spring 38 away from the other end portion 38b or 38a of spring 38 retained by shaft 37, thereby being biased by spring 38 toward its neutral position. By releasing pedal 8 from the depression force, end portion 38a or 38b abutting against pin 31c returns to its initial position so as to push pin 31c toward shaft 37, thereby returning lever 31a and swash plate 33b together to their neutral positions.

Figure 7:
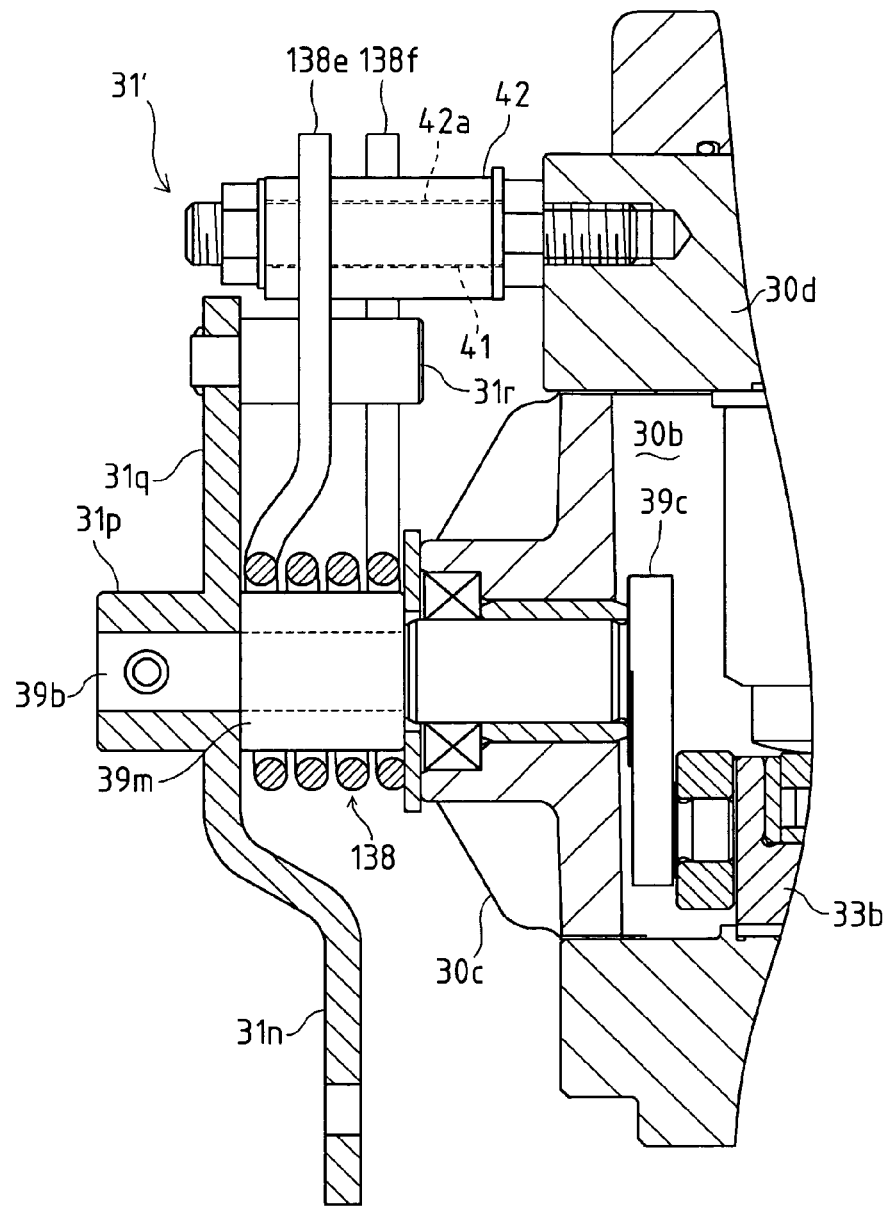
FIG. 7 is a fragmentary enlarged sectional rear view of the same portion of vehicle 1 shown in FIG. 4, showing a neutral returning mechanism of a hydraulic motor 33 in pump unit 30.
Figure 7:
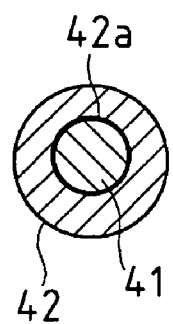

An alternative neutral returning mechanism 31' is shown in FIGS. 7 and 7(a), with a horizontal shaft 41 screwed at one end portion thereof into center section 30d, and extended out from center section 30d so as to be inserted into a hole 42a axially penetrating a neutral adjusting sleeve 42. Hole 42a is eccentric to the central axis of sleeve 42. A nut is screwed on the other end portion of shaft 41 projecting out from sleeve 42 opposite to center section 30d so as to fasten shaft 41 to center section 30d. By loosening the nut, sleeve 42 is allowed to revolve around shaft 41 so as to adjust the neutral position of a speed-control lever 31n operatively connected to speed-control pedal 8 in correspondence to the neutral position of swash plate 33b.

Horizontal speed-control shaft 39b rotatably supported by middle casing 30c is fixed to arm 39c in pump chamber 30b enclosed by middle casing 30c so as to be fitted to swash plate 33b, similarly to that of FIG. 6. Speed-control shaft 39b projects out from middle casing 30c so as to be fixedly provided thereon with a cylinder 39m. Speed-control lever 31n operatively connected to speed-control pedal 8 is fixed at its basic portion 31p onto an outer end portion of speed-control shaft 39b projecting outward from cylinder 39m. A lever 31q is extended from basic portion 31p oppositely to speed-control lever 31n. A horizontal pin 31r projects from an utmost end of lever 31q in parallel to sleeve 42. A neutral returning spring 138 is coiled and retained on cylinder 39m. Both end portions 138e and 138f of spring 138 are twisted to cross each other and extended in parallel so as to nip pin 31r and sleeve 42 at their initial (neutral) positions.

Due to the above, depression of speed-control pedal 8 shown in FIG. 1 rotates speed-control lever 31n so as to rotate cylinder 39m, shaft 39b and arm 39c, thereby tilting swash plate 33b to a target position for determining amount and direction of hydraulic fluid delivered from hydraulic pump 33. Pin 31r rotating together with levers 31n and 31q by depression of pedal 8 pushes one of end portions 138e and 138f of spring 138 away from the other end portion 138f or 138e of spring 138 retained by sleeve 42, thereby being biased by spring 138 toward its neutral position. By releasing pedal 8 from the depression force, end portion 138e or 138f abutting against pin 31r returns to its initial position so as to push pin 31r toward sleeve 42, thereby returning lever 31n and swash plate 33b together to their neutral positions.

In comparison with neutral returning mechanism 31 of FIG. 6, alternative neutral returning mechanism 31 is simple because shaft 41 planted into center section 30d requires no stay like stay 37a.

Figure 8:
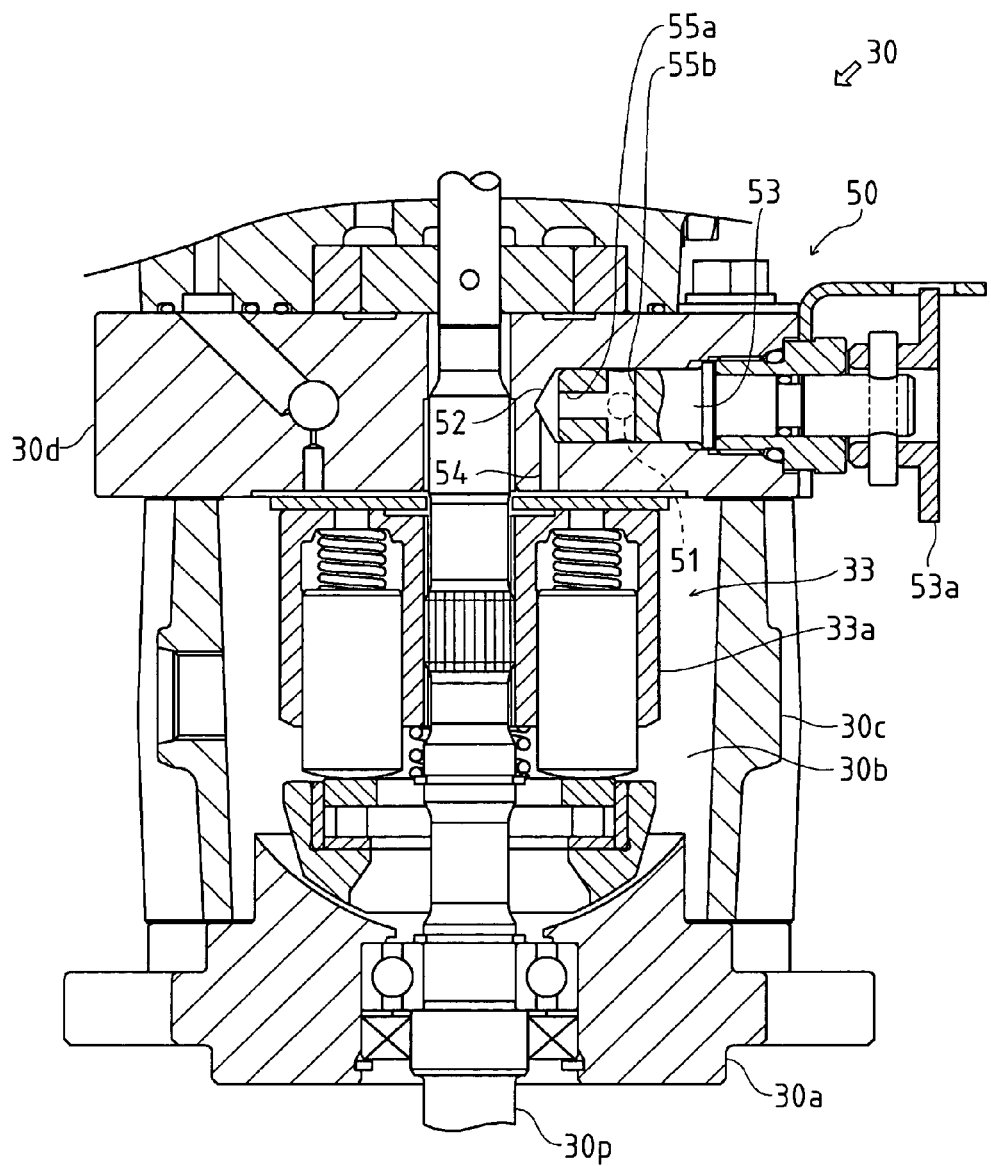
FIG. 8 is an enlarged sectional side view of pump unit 30 showing a draining valve 50.

A bypass valve 50 as shown in FIG. 8 is interposed on a bypass duct 51 between the higher and lower pressured hydraulic oil ducts in pump unit 30, as shown in FIG. 3. Bypass valve 50 normally cuts off bypass duct 51 so as to ensure the proper circulation of hydraulic fluid between the higher and lower pressured hydraulic fluid ducts in pump unit 30 through pump 33 for supplying motors 11A and 11B with the hydraulic fluid.

When fresh hydraulic fluid is filled into the hydraulic circuit of pump 33 and motors 11A and 11B in the process of manufacturing vehicle 1, bypass valve 50 opens bypass duct 50 into communication with pump chamber 30b, as shown in FIG. 8, so as to pass hydraulic oil with waste air from the fluid ducts formed in center section 30d to pump chamber 30b, thereby properly filling hydraulic fluid without air bubbles in the hydraulic circuit of pump 33 and motors 11A and 11B. The air in the fluid sump in pump chamber 30b is finally exhausted to reservoir tank 40 via pipe 87.

When vehicle 1 is hauled, bypass valve 50 also opens bypass duct 51 to pump chamber 30b so as to drain hydraulic fluid from the hydraulic circuit, thereby allowing free rotation of drive wheels of vehicle 1.

Referring to FIG. 8, the higher and lower pressured hydraulic fluid ducts and bypass duct 51, as shown in FIG. 3, are formed in center section 30d so as to communicate with hydraulic pump 33 mounted on center section 30d. Bypass valve 50 comprises a horizontally axial valve member 53 rotatably inserted into a horizontal valve chamber 52 bored in center section 30d across bypass duct 51 perpendicularly. In center section 30d is also formed a drain passage 54 extended downward from valve chamber 52. Drain passage 54 is downwardly open into pump chamber 30b through a gap between cylinder block 33a (in detail, a valve plate between cylinder block 33a and center section 30d) of pump 33 and the bottom surface of center section 30d.

Valve member 53 is provided therein with an axial hole 55a and a penetrating radial hole 55b. Axial hole 55a is constantly open at an outer end thereof to drain passage 54 through valve chamber 52 and connected at an inner end thereof to radial hole 55*b*. When valve member 53 set in a closed-valve position for cutting off bypass duct 51 is viewed in sectional side, as shown in FIG. 8, holes 55*a* and 55*b* are arranged in a T-like shape so that hole 55*b* is disposed in perpendicular to bypass duct 51. By rotational location of valve member 53 to an open-valve position, open ends of radial hole 55*b* are opened to bypass duct 51, i.e., radial hole 55*b* makes complete bypass duct 51 bypassing the higher and lower pressured hydraulic fluid ducts in center section 30*d*, whereby hydraulic fluid is drained from complete bypass duct 51 to pump chamber 30*b* through hole 55*a*, valve chamber 52 and drain passage 54.

Valve member 53 projects at an outer end thereof outward from center section 30*d* and integrally rotatably fits to a rotary member 53*a*, which is operatively connected to a manipulator (not shown) for switching the rotational position of valve member 53 between the open-valve position and the closed-valve position.

Front transaxle 10A will now be described in accordance with FIGS. 9 to 13. In the following description, front transaxle 10A represents rear transaxle 10B because of their common main structures, thereby omitting description of rear transaxle 10B unless it is specially mentioned.

Figure 9:
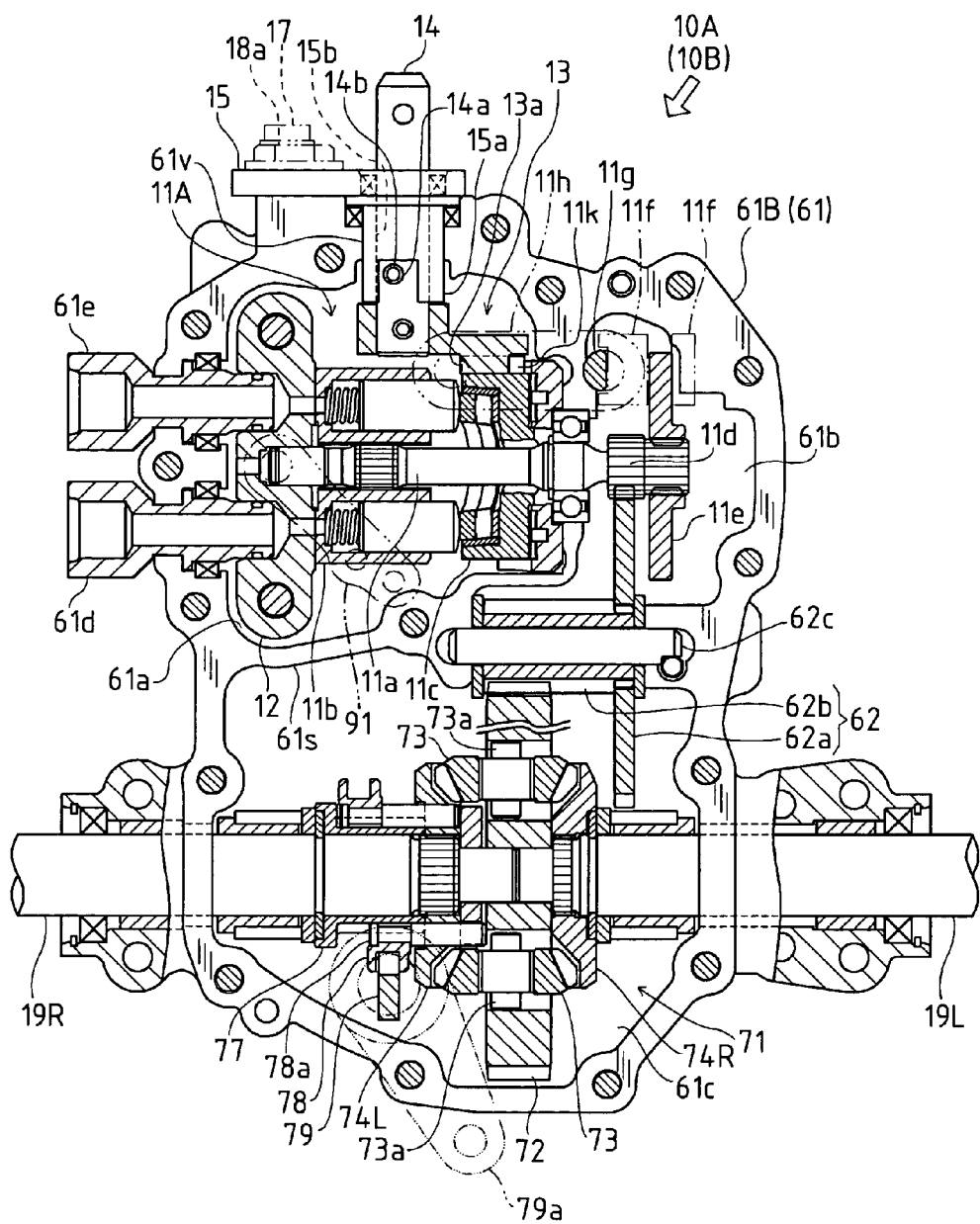
FIG. 9 is a bottom view of transaxle 10A (may be replaced with transaxle 10B) with a bottom casing part 61A removed.

Referring to FIG. 9, transaxle 10A comprises a casing 61 whose internal space is divided into a motor chamber 61*a*, a brake chamber 61*b* and a differential gearing chamber 61*c*. A hydraulic motor 11A (if in transaxle 10B, a hydraulic motor 11B) is disposed in motor chamber 61*a*. A differential gearing assembly 71 is disposed in differential gearing chamber 61*c*.

Deceleration gearing interposed between a motor shaft 11*a* and differential gearing assembly 71 includes a first part provided on motor shaft 11*a* and a second part provided on a counter shaft 62*c*. In brake chamber 61*b* are disposed a brake mechanism including a brake rotor 11*e* on a motor shaft 11*a*, and the first part of the deceleration gearing including a gear 11*d* on motor shaft 11*a*.

A vertical partition wall 61*s* is formed in casing 61 so as to separate motor chamber 61*a* from brake chamber 61*b* and differential gearing chamber 61*c*. An intermediate gear 62, i.e., gears 62*a* and 62*b* provided on counter shaft 62*c*, serving as the second part of the deceleration gearing, is disposed between chambers 61*b* and 61*c* in casing 61 so as to separate chambers 61*b* and 61*c* from each other.

Figure 10:
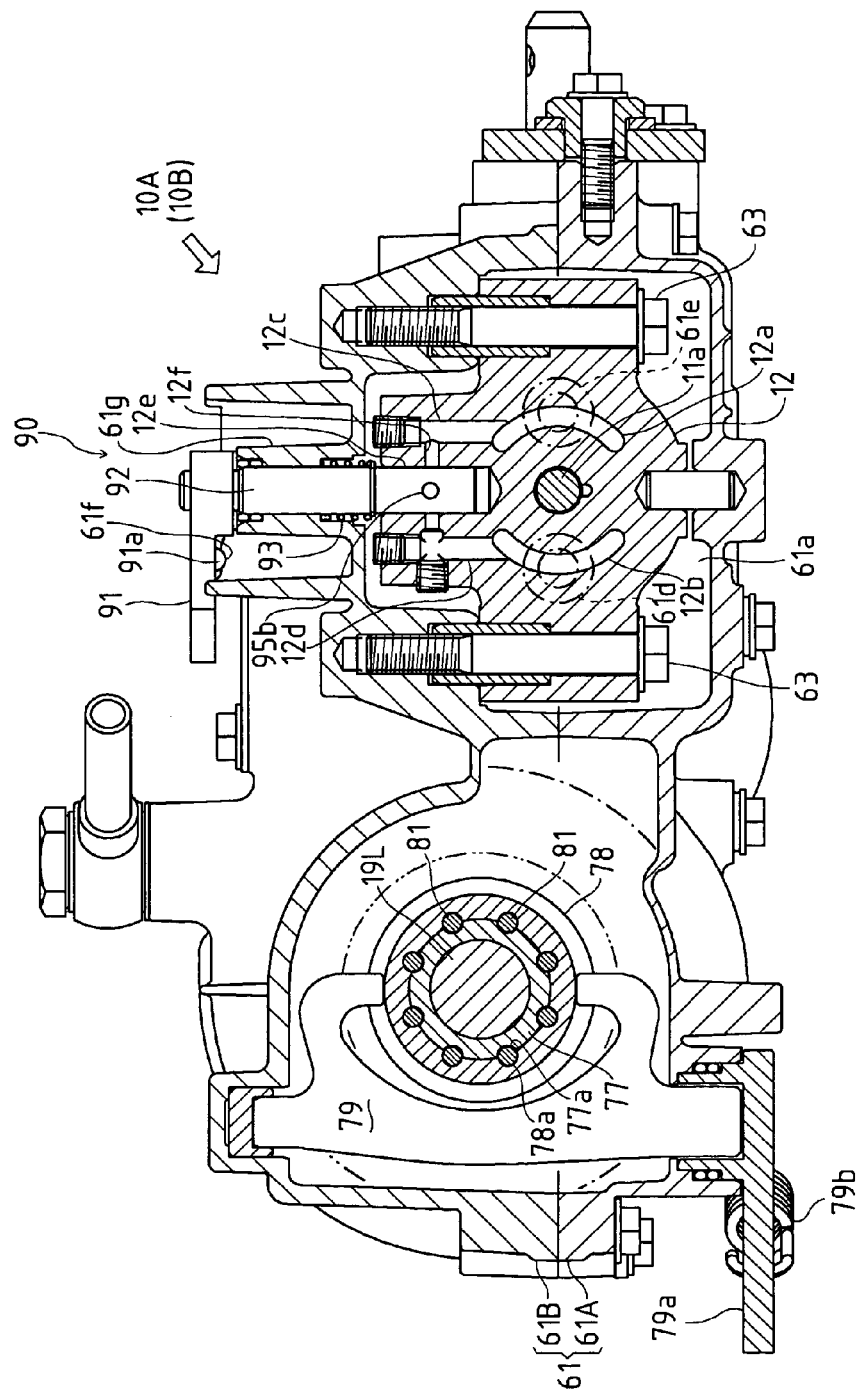
FIG. 10 is a sectional right side view of transaxle 10A (or 10B) showing a hydraulic motor 11A (may be replaced with a hydraulic motor 11B) and a differential locking mechanism therein.
Figure 11:
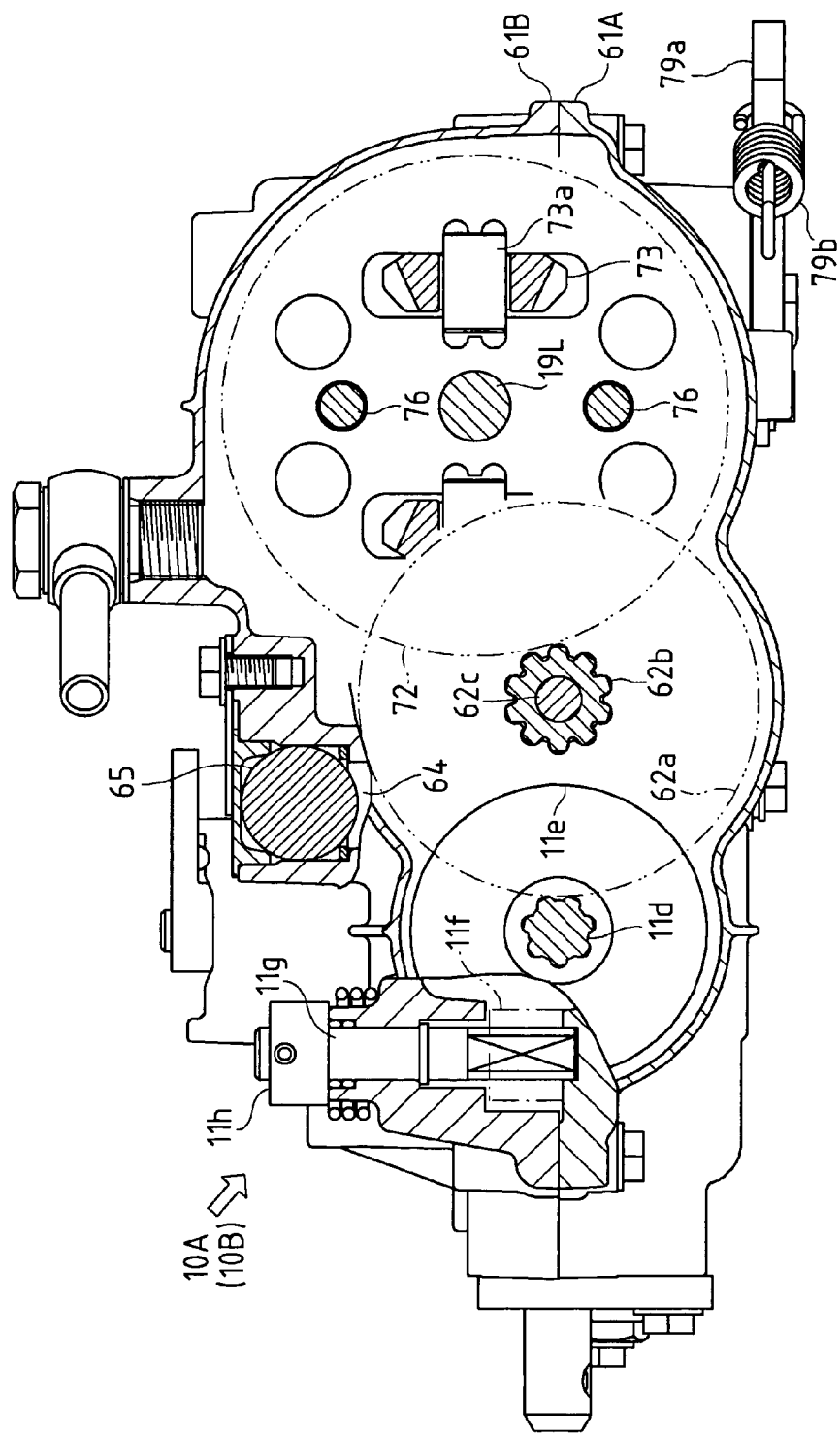
FIG. 11 is a sectional left side view of transaxle 10A (or 10B) showing a deceleration gearing therein.

Referring to FIGS. 10 and 11, casing 61 is dividable into a lower casing part 61A and an upper casing part 61B along a horizontal joint surface. FIG. 9 illustrates only upper casing part 61B, i.e., casing 61 from which lower casing part 61A is removed. Counter shaft 62*c* and motor shaft 11*a* have central axes disposed on the horizontal joint surface between lower and upper casing parts 61A and 61B. Later-discussed axles 19L and 19R are disposed higher than shafts 62*c* and 11*a* and supported by upper casing part 61B.

Referring to FIG. 11, motor chamber 61*a* and differential gearing chamber 61*c* are mutually open through a passage 64 bored in partition 61*s*, thereby allowing flow of fluid between chambers 61*a* and 61*c*. A discoid magnet 65 is disposed in passage 64 so as to adsorb metallic impurities such as iron powder in the fluid.

Figure 13:
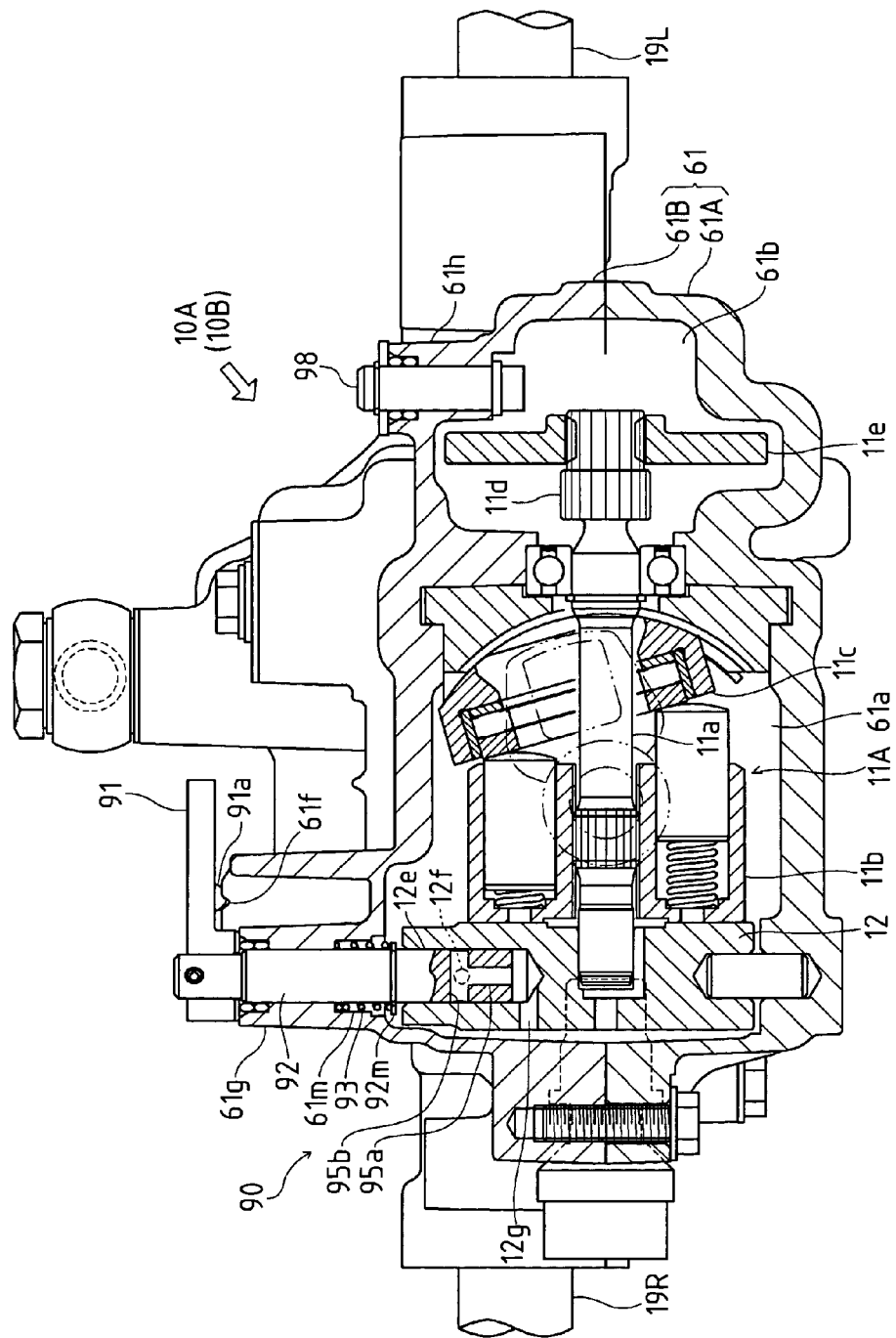
FIG. 13 is a sectional front view of transaxle 10A (or 10B) showing hydraulic motor 11A (or 11B) therein in a case where a clutch is not interposed between a motor shaft 11a and a motor gear 11d.

Referring to FIGS. 9 and 13, motor shaft 11*a*, a cylinder block 11*b*, a movable swash plate 11*c* and a center section 12 are disposed in motor chamber 61*a* so as to constitute variable displacement hydraulic motor 11A.

Horizontal motor shaft 11*a* is disposed laterally, i.e., perpendicular to the traveling direction of vehicle 1. Motor shaft 11*a* is extended at one end thereof into brake chamber 61*b*. The end portion of motor shaft 11*a* in brake chamber 61*b* is toothed to serve as gear 11*d*.

Referring to the brake mechanism in brake chamber 61*b* as shown in FIG. 9, discoid brake rotor 11*e* is fixedly fitted on the end portion of motor shaft 11*a* formed by extended gear 11*d*. A pair of brake pads 11*f* are disposed in brake chamber 61*b* so as to pass brake rotor 11*e* therebetween. A vertical camshaft 11*g* is rotatably disposed adjacent to partition wall 61*s*. An intermediate portion of camshaft 11*g* is semicircular in sectional plan view so as to serve as a cam. One end of camshaft 11*g* projects outward from casing 61 so as to be fixedly provided thereon with a brake arm 11*h*, which is operatively connected to a brake pedal or another braking operation device so as to be switched between a braking position and a brake-releasing position opposite to each other.

When brake arm 11*h* is set to the brake-releasing position, the cam portion of camshaft 11*g* is fitted to partition wall 61*s* so that the space between brake pads 11*f* is expanded so as to freely pass brake rotor 11*e* therethrough. When brake arm 11*h* is set at the braking position opposite to the brake-releasing position, the cam portion of camshaft 11*g* faces to brake pads 11*f* so as to press brake pads 11*f* against brake rotor 11*e* therebetween, thereby braking brake rotor 11*e* and motor shaft 11*a*.

Referring to FIG. 9, counter shaft 62*c* between chambers 61*b* and 61*c* is disposed in parallel to motor shaft 11*a*, and diametrically small gear 62*b* with diametrically large gear 62*a* fixedly fitted thereon is freely rotatably provided on counter shaft 62*c* so as to serve as intermediate gear 62, i.e., the second part of the deceleration gearing. Large gear 62*a* meshes with gear 11*d* on motor shaft 11*a* in brake chamber 61*b*, and small gear 62*b* meshes with a bull gear 72 of differential gearing assembly 71 in differential gearing chamber 61*c*.

Referring to FIGS. 9 to 12, differential gearing assembly 71 in differential gearing chamber 61*c* comprises bull gear 72, pinions 73, left and right axles 19L and 19R, and differential side gears 74L and 74R fixed on respective axles 19L and 19R. In bull gear 72, pinion shafts 73*a* are relatively rotatably disposed in a radial direction of bull gear 72, and pinions 73 are fitted on respective pinion shafts 73*a*, as shown in FIG. 9. Horizontal axles 19L and 19R are disposed laterally in parallel to motor shaft 11*a* and counter shaft 62*c*, and journalled by upper casing part 11B. Proximal ends of axles 19L and 19R are relatively rotatably fitted into vertical bull gear 72 so as to serve as the rotary axis of bull gear 72. Differential side gears 74L and 74R fixed on respective axles 19L and 19R mesh with each of pinions 73 therebetween.

Figure 12:
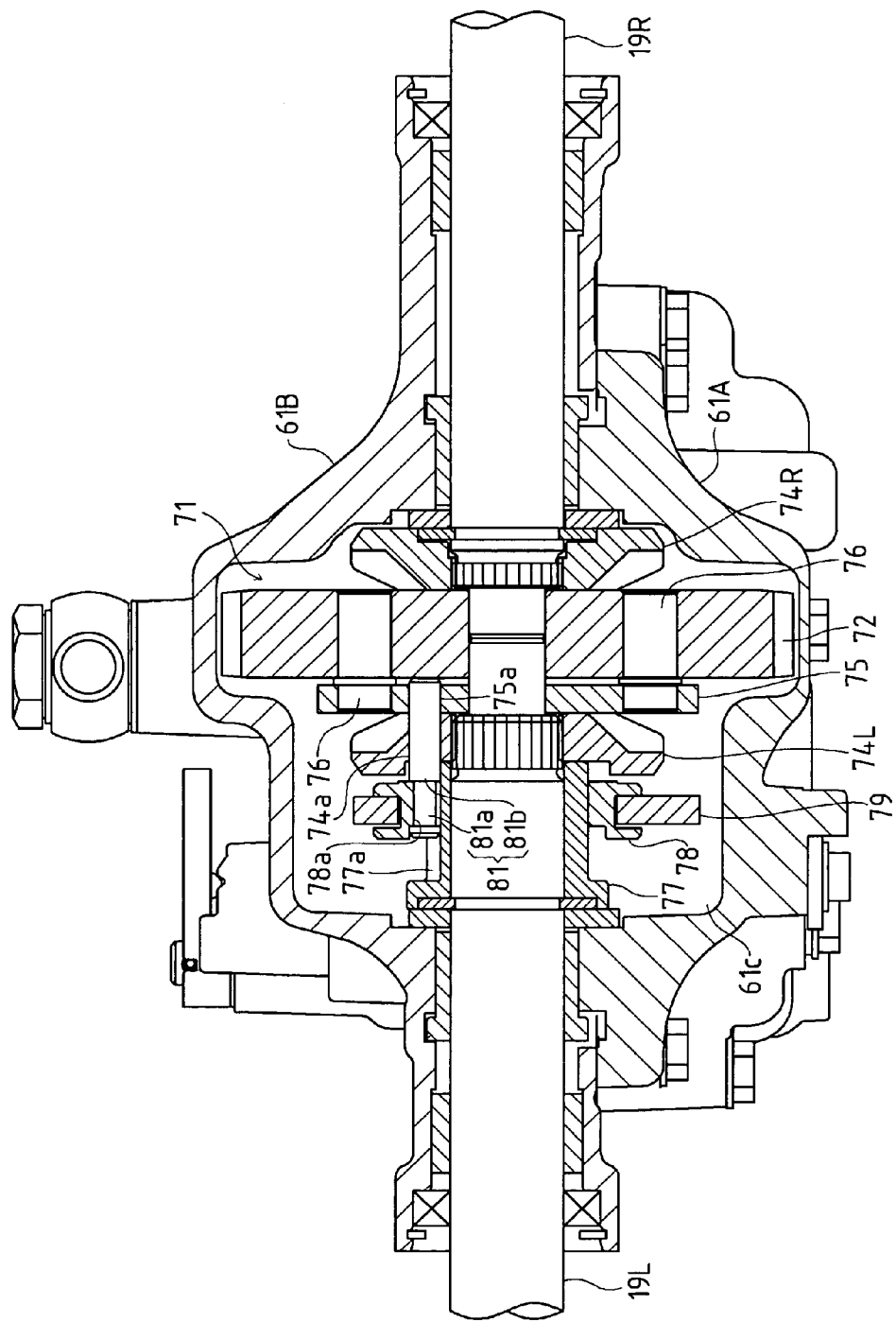
FIG. 12 is a sectional rear view of transaxle 10A (or 10B) showing a differential gearing therein.

A differential locking mechanism for locking differential gearing assembly 71 is provided around left axle 19L, as shown in FIGS. 10 and 12. Alternatively, such a mechanism may be provided around right axle 19R. Referring to the differential locking mechanism shown in FIG. 12, a vertical disk 75 is relatively rotatably supported on the proximal end of left axle 19L between bull gear 72 and side gear 74L. Fastener pins 76 penetrate bull gear 72 and disk 75 together so as to fasten disk 75 to bull gear 72. Namely, disk 75 is rotatable integrally with bull gear 72 relative to left axle 19L.

Referring to FIGS. 9, 10 and 12, a guide sleeve 77 is relatively rotatably fitted on axle 19L, and a ring-like slider 78 is axially slidably fitted on axle 19L. Slider 78 is provided with an annular groove along the outer periphery thereof. A shifter 79 is fitted into the annular groove so as to nip slider 78. An end of shifter 79 projects outward from casing 61 (lower casing part 61A) and engages with a differential locking arm 79a rotatably fitted onto lower casing part 61A. Rotation of arm 79a moves shifter 79 so as to slide slider 78 along guide sleeve 77 in the axial direction of axle 19L. A spring 79b is interposed between arm 79a and lower casing part 61A so as to bias arm 79a to its unlocking position for ensuring differential rotation of axles 19L and 19R.

Referring to FIGS. 9, 10 and 12, guide sleeve 77 is formed with sectionally semicircular grooves 77a extended in parallel to axle 19L and juxtaposed with one another along the outer periphery of guide sleeve 77. Slider 78 is formed with sectionally semicircular grooves 78a extended in parallel to axle 19L and juxtaposed with one another along the inner periphery of slider 78. In the state that the outer periphery of guide sleeve 77 coincides with the inner periphery of slider 78, grooves 78a are arranged around axle 19L at regular intervals corresponding to respective grooves 77a so as to form sectionally circular holes with grooves 77a.

Referring to FIGS. 10 and 12, horizontal differential locking pins 81 are inserted in the holes between guide sleeve 77 and slider 78. More specifically, each of pins 81 has an end portion 81a fixedly inserted in each of the holes formed by grooves 78a with grooves 77a. The rest portion of pin 81 diametrically larger than end portion 81a is a sliding portion slidably fitted to each of grooves 77a of guide sleeve 77. Differential side gear 74L is penetrated by holes 74a arranged at regular intervals around axle 19L. Ends of sliding portions 81b of pins 81 opposite to end portions 81a are slidably inserted into respective holes 74a.

Holes 75a corresponding to respective holes 74a penetrate disk 75. When arm 79a is disposed at the unlocking position, the ends of sliding portions 81b of pins 81 are disposed in holes 74a so as not to enter holes 75a. When arm 79a is disposed at the locking position, the ends of sliding portions 81b of pins 81 project from holes 74a and enter holes 75a so as to fix slider 78 to disk 75, thereby locking axle 19L to bull gear 72, i.e., canceling the differential rotation of axles 19L and 19R.

Incidentally, in FIG. 9, slider 78 looks as if it were divided by axle 19L into a portion toward motor 11A and a portion opposite to motor 11A axially shifted from each other. Of course, such an appearance of slider 78 is actually impossible. The illustration of slider 78 in FIG. 9 is just for convenience of description of its actuation. The portion of slider 78 with pin 81 separated from disk 75 on the side of axle 19L toward motor 11A is illustrated as being set when differential locking arm 79a is positioned at the unlocking position. The portion of slider 78 with pin 81 inserted into disk 75 on the side of axle 19L opposite to motor 11A is illustrated as being set when differential locking arm 79a is positioned at the locking position.

Incidentally, disk 75 is made of material having such high strength as to prevent breaking thereof caused by the shock of insertion of sliding portions 81b of pins 81 into penetrating holes 75a of disk 75. Alternatively, disk 75 may be removed and pins 81 may be directly inserted into bull gear 72. However, large bull gear 72 is made of sintered metal having a small Charpy impact value for saving cost, and is penetrated by holes for supporting pinions 73. Such bull gear 72 may possibly be broken by insertion of pins 81 thereinto. Therefore, high strength disk 75 fastened to bull gear 72 is preferable.

Each of bypass valves 90 in respective transaxles 10A and 10B, as shown in FIGS. 10 and 13, is interposed on a bypass duct 12f between higher and lower pressured hydraulic fluid ducts 12c and 12d connected to each of hydraulic motors 11A and 11B. Bypass valve 90 normally cuts off bypass duct 12f so as to ensure the proper circulation of hydraulic fluid between higher and lower pressured hydraulic fluid ducts 12c and 12d in each of transaxles 10A and 10B for supplying motors 11A and 11B with the hydraulic fluid.

When fresh hydraulic fluid is filled into the hydraulic circuit of pump 33 and motors 11A and 11B in the process of manufacturing vehicle 1, bypass valve 90 opens bypass duct 12f into communication with motor chamber 61a in casing 61, as shown in FIG. 13, so as to pass hydraulic oil with waste air from the hydraulic fluid ducts in center section 12 to motor chamber 61a, thereby properly filling hydraulic fluid without air bubbles in the hydraulic circuit of pump 33 and motors 11A and 11B. Air in each of transaxles 10A and 10B is finally exhausted to reservoir tank 40 through each of pipes 81 and 82.

When vehicle 1 is hauled, bypass valve 90 also opens bypass duct 12f to motor chamber 61a so as to drain hydraulic fluid from the hydraulic circuit, thereby allowing free rotation of drive wheels of vehicle 1.

Referring to FIGS. 10 and 13, a pair of kidney ports 12a and 12b are bored in center section 12 and open to hydraulic motor 11A (hereinafter, if in transaxle 10B, hydraulic motor 11B) mounted on center section 12. As shown in FIGS. 1, 9 and 10, horizontal pipe connectors 61d and 61e opened to respective kidney ports 12a and 12b are disposed on the horizontal joint surface between upper and lower casing parts 61B and 61A so as to be clamped by casings parts 61A and 61B. Pipe 84 is interposed between pipe connector 61e of rear transaxle 10B and pipe connector 61d of front transaxle 10A, pipe 83 is connected to pipe connector 61d of rear transaxle 10B, and pipe 85 to pipe connector 61e of front transaxle 10A, as understood from FIGS. 2 and 3.

In center section 12, vertical holes 12c and 12d are extended upward from respective kidney ports 12a and 12b, and a horizontal hole 12f is bored between vertical holes 12c and 12d so as to form a bypass duct between kidney ports 12a and 12b. Bypass valve 90 comprises a vertically axial valve member 92 rotatably inserted into a vertical valve chamber 12e bored in center section 12 across horizontal hole 12f of the bypass duct perpendicularly. In center section 12 is also formed a horizontal drain passage 12g extended from valve chamber 12e. Drain passage 12g is open into motor chamber 61a at a side surface of center section 12 opposite to motor 11A.

In center section 12, valve member 92 is provided therein with an axial hole 95a and a penetrating radial hole 95b. Axial hole 95a is constantly open at an outer end thereof to drain passage 12g through valve chamber 12e and connected at an inner end thereof to radial hole 95b. When valve member 92 set in a closed-valve position for cutting off bypass duct 12f is viewed in sectional front, as shown in FIG. 13, holes 95a and 95b are arranged in a T-like shape so that hole 95b is disposed in perpendicular to bypass duct 12f. By rotational location of valve member 92 to an open-valve position, open ends of radial hole 95b are opened to bypass duct 12f, i.e., radial hole 95b makes complete bypass duct 12f bypassing higher and lower pressured hydraulic fluid ducts 12c and 12d in center section 12, whereby hydraulic fluid is drained from complete bypass duct 12f to motor chamber 61a through hole 95a, valve chamber 12e and drain passage 12g.

Vertical valve member 92 penetrates an upright boss portion 61g of upper casing part 61B above center section 12 and projects upward from upper casing part 61B so as to be fixed at the top thereof to a horizontal lever 91, which is operatively connected to a manipulator (not shown) for switching the rotational position of valve member 92 between the open-valve position and the closed-valve position.

A projection 91a projects downward from arm 91, and two detent recesses 61f corresponding in location to projection 91a are open upward on the top surface of upper casing part 61B. Detent recesses 61f contain a right angle therebetween centered on the central axis of valve member 92, and are defined as the open-valve position and the closed-valve position of bypass valve 90, respectively. In upper casing part 61B above center section 12, a retaining ring 92m is fixed on valve member 92. The bottom of boss portion 61g of upper casing part 61B is recessed upward so as to form a spring chamber 61m, in which a spring 93 is wound around valve member 92 between retaining ring 92m and a ceiling of spring chamber 61m thereabove so as to press retaining ring 92m downward, thereby constantly biasing arm 91 downward and ensuring the detent of projection 91a into recess 61f.

To shift bypass valve 90 between the open-valve position and the closed-valve position, arm 91 is slightly raised against the downward biasing force of spring 93 so as to remove projection 91a from one of recesses 61f, and then, arm 91 is rotated to the other recess 61f. By releasing arm 91, arm 91 is lowered by the spring force so as to fit projection 91a into the other recess 61f.

Figure 14:
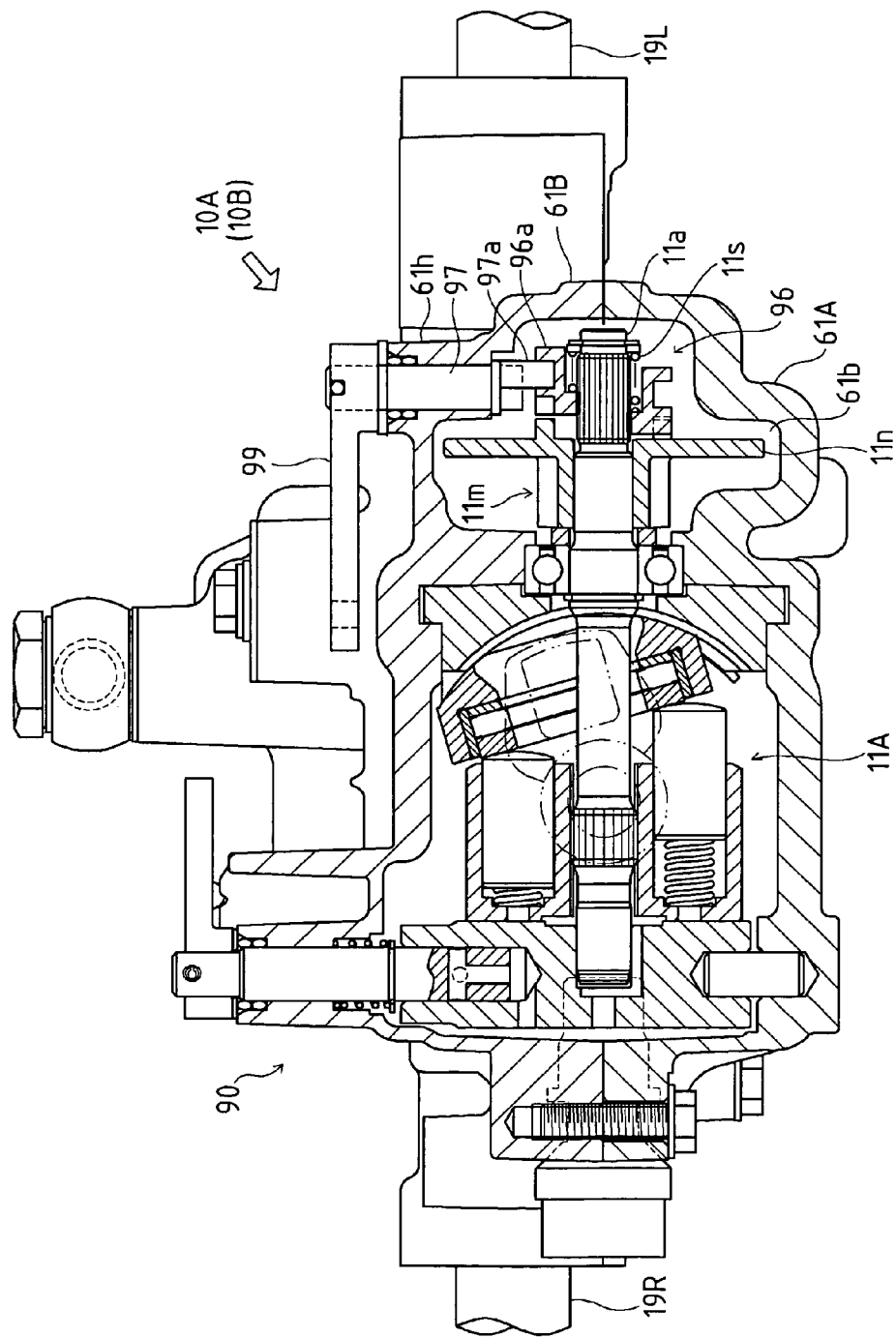
FIG. 14 is a sectional front view of transaxle 10A (or 10B) showing hydraulic motor 11A (or 11B) therein in a case where a clutch device 96 is interposed between motor shaft 11a and a motor gear 11m.

Preferably, a clutch device 96 may be provided on motor shaft 11a in brake chamber 61b, as shown in FIG. 14. In this embodiment, a motor gear 11m is relatively rotatably provided on motor shaft 11 in brake chamber 61b, and a laterally outer end of motor gear 11m is radially extended to serve as a discoid brake rotor 11n.

Clutch device 96 comprises a clutch slider 96a not-relatively rotatably but axially slidably spline-fitted on an end portion of motor shaft 11a projecting laterally outward from motor gear 11m (brake rotor 11n). In FIG. 14, clutch slider 96a looks as if it were divided by motor shaft 11a into an upper portion and a lower portion axially shifted from each other. Of course, such an appearance of clutch slider 96 is actually impossible. The illustration of clutch slider 96a in FIG. 14 is just for convenience of description of its actuation. The upper portion of clutch slider 96a separated from brake rotor 11n is illustrated as being set in an unclutching position. The lower portion of clutch slider 96a engaging with brake rotor 11n is illustrated as being set in a clutching position.

A spring 11s is coiled around motor shaft 11a in clutch slider 96a so as to bias clutch slider 96a toward brake rotor 11n (motor gear 11m), thereby initially fixing clutch slider 96a to brake rotor 11n (motor gear 11m), i.e., setting clutch slider 96a to the clutching position.

An upright boss portion 61h formed of upper casing member 61B above clutch slider 96 rotatably supports a vertical clutch operation shaft 97 whose bottom projection 97a is fitted into an annular groove formed along the outer periphery of clutch slider 96a. The vertical axis of projection 97a is eccentric to the vertical axis of shaft 97. Clutch operation shaft 97 projects upward from upper housing member 61B so as to be fixedly provided with a clutch arm 99.

Due to the eccentricity of projection 97a relative to shaft 97, by rotating arm 99 together with shaft 97, shaft 97 is rotated by rotating arm 99 so as to revolve projection 97a around the axis of shaft 97, thereby moving clutch slider 96 along motor shaft 11a. Arm 99 must be forcibly rotated against the biasing force of spring 11s so as to shift clutch slider 96a to the unclutching position where clutch slider 96a is separated from brake rotor 11n.

When vehicle 1 is hauled, arm 99 is rotated for setting clutch slider 96a to the unclutcing position so as to make motor gear 11m rotatable relative to motor shaft 11a, thereby drivingly separating intermediate gear 62 and axles 19L and 19R from motor shaft 11a, i.e., allowing free rotation of axles 19L and 19R. Even when motor gear 11m is drivingly separated from motor shaft 11a by the unclutching operation, the braking operation for braking axles 19L and 19R is allowed due to brake rotor 11n integrated with motor gear 11m.

When hauling of vehicle 1, the above-mentioned bypass valve 90 may be operated for draining so as to ensure free rotation of axles 19L and 19R. The opening of bypass valves 90 of both transaxles 10A and 10B allows rotation of both motors 11A and 11B free from pump 33. However, some remaining hydraulic fluid still circulates in the hydraulic circuit of pump 33 and motors 11A and 11B so that center section 12 resists cylinder block 11b of each of motors 11A and 11B slidably rotating thereon, thereby resisting rotation of axles 19L and 19R of each of transaxles 10A and 10B. On the other hand, the unclutching of clutch device 96 of each of transaxles 10A and 10B perfectly drivingly separates axles 19L and 19R from each of motors 11A and 11B so that vehicle 1 can be hauled by light traction force.

Incidentally, when clutch device 96 is not disposed in casing 61, boss portion 61h of upper casing member 61B is plugged by a shaft 98 replacing clutch operation shaft 97, as shown in FIG. 13, or such a boss portion 61h for supporting shaft 97 is not formed in upper casing member 61B.

Figure 21:
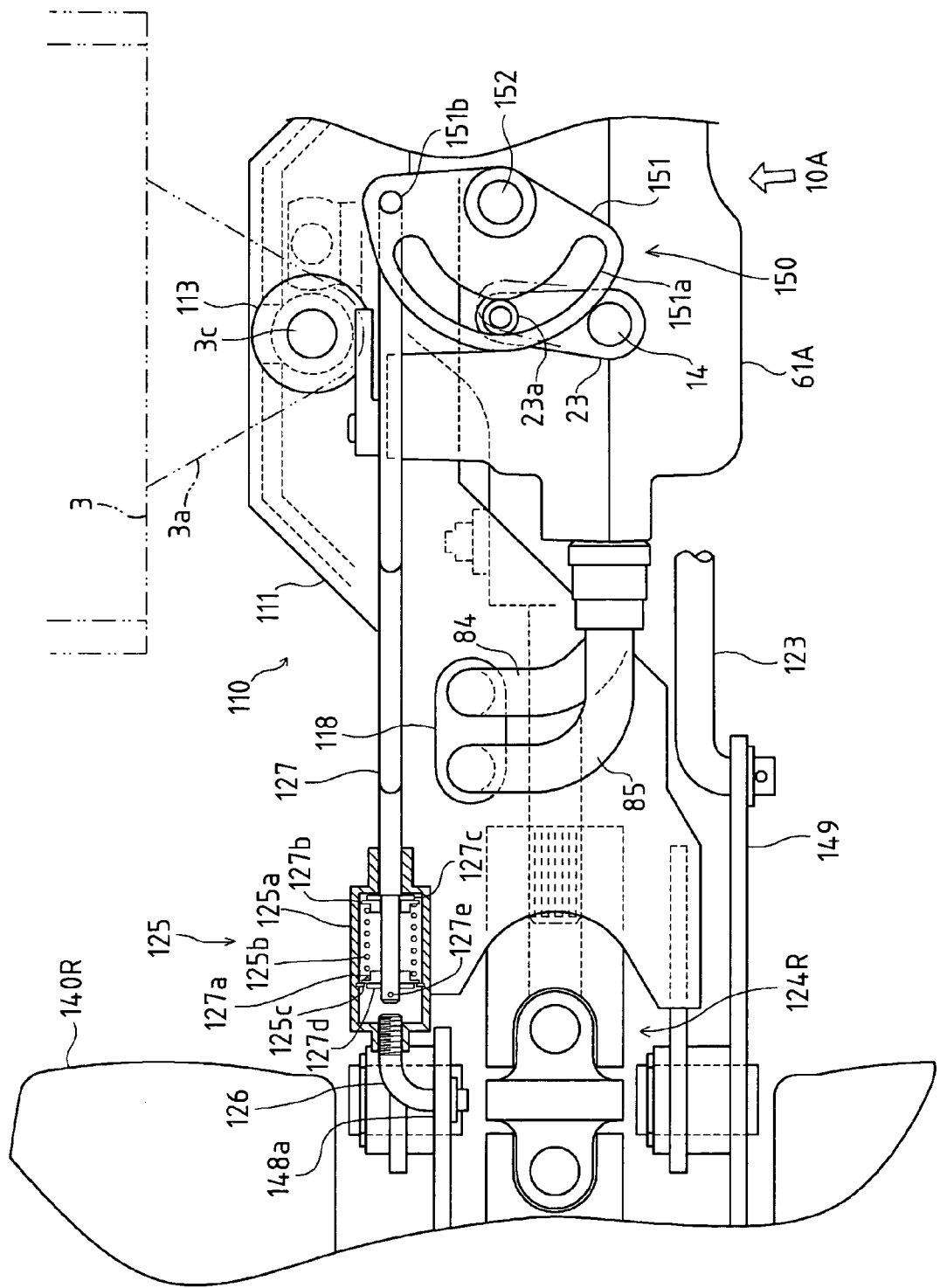
FIG. 21 is a fragmentary enlarged sectional front view of the portion of vehicle 1 shown in FIG. 18 showing a linkage between a right tire 140R and a control lever 23 for controlling swash plate 11c with a guide mechanism 150.

Referring to a mechanism for adjusting the tilt of movable swash plate 11c, as shown in FIG. 9, swash plate 11c has an engaged side 11k to which an engaging end 13a of a control arm 13 disposed in casing 61 is fitted. Horizontal control shaft 14 is rotatably supported by casing 61 (between upper and lower casing parts 61B and 61A), and an end of control arm 13 opposite to engaging end 13a is fixed to an inner end of shaft 14 in casing 61. As shown in FIG. 21, control lever 23 is fixed onto an outer end portion of shaft 14 outside casing 61. By rotating lever 23 together with shaft 14, arm 13 is rotated so as to change the tilt angle of swash plate 11c.

A mechanism for defining the tilt angle range of swash plate 11c comprises a shaft holder 15 for holding control shaft 14. A side wall of casing 61 is penetrated by a hole 61v between motor chamber 61a and the outside of casing 61, as shown in FIG. 9. Shaft holder 15 includes a boss portion 15a of shaft holder 15 having an axial penetrating hole 15b. Boss portion 15a of shaft holder 15 is fitted into hole 61v and rotatably penetrated by control shaft 14 through hole 15b. Shaft holder 15 also includes a plate portion 15c fitted onto an outer side surface of casing 61. Plate portion 15c of shaft holder 15 is fastened by screw shafts with nuts (or bolts) 17 and 18a to casing 61 so as to fix boss portion 15a in location. As discussed later, by loosening the nuts or bolts, plate portion 15c can be rotated around screw shaft 18a so as to adjust the angle of boss portion 15a relative to control shaft 14.

Shaft holder 15 can hold control shaft 14 and swash plate 11c to be rotatable so as to set corresponding motor 11A or 11B into the variable displacement type, and can determine the rotational limit of control shaft 14 at the angle of swash plate 11c defining the minimum displacement of corresponding motor 11A or 11B, whichever direction the rotation of corresponding motor 11A or 11B may be set in relative to the flow direction of hydraulic fluid through motor 11A or 11B. In this regard, referring to FIG. 15, boss portion 15a is bored by a pair of substantially radial eccentric holes 25 and 26 oppositely extended from axial penetrating hole 15b. Control shaft 14 has a radial key slot 14b with a key 14a fitted therein. Key 14a projects radially outward from an end of slot 14b so as to enter one of holes 25 and 26. While holes 25 and 26 are so wide as to allow movement of key 14a therein, the rotational angle of key 14a in each of holes 25 and 26 is limited between angles A1 and A2, as shown in each of FIGS. 15 and 16.

Figure 15:
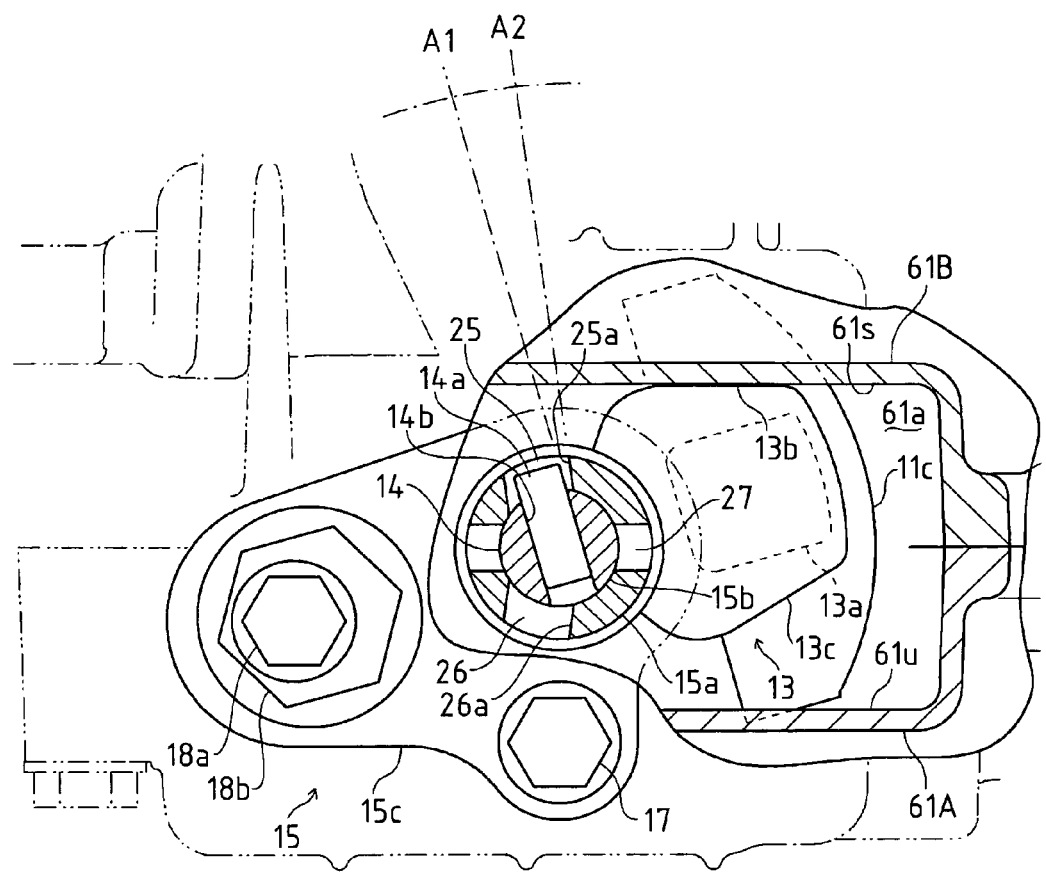
FIG. 15 is a fragmentary enlarged front view partly in section of transaxle 10A (or 10B) showing a mechanism including a shaft holder 15 holding a control shaft 14 for defining a tilt angle range of a movable swash plate 11c.

When shaft 14 is located in rotation so as to set key 14a to angle A1, swash plate 11c is disposed so as to maximize the displacement of corresponding one of motors 11A and 11B. Control arm 13 has an upper end surface 13b and a lower end surface 13c opposite to each other in the rotational direction thereof. Control arm 13 is disposed between an inner horizontal surface 61s of upper casing part 61B and an inner horizontal surface 61u of lower casing part 61A, which face to motor chamber 61a therebetween. As shown in FIG. 15, when upper end surface 13b of control arm 13 abuts against inner horizontal surface 61s of upper casing part 61B downwardly facing to motor chamber 61a, key 14a is disposed at angle A1 so as to set swash plate 11c for maximizing the displacement of corresponding motor 11A or 11B. When shaft 14 is located in rotation so as to set key 14a to angle A2, swash plate 11c is disposed so as to minimize the displacement of corresponding one of motors 11A and 11B.

Hole 25 has end surfaces opposite to each other in the rotational direction of key 14a (shaft 14), and one of the end surfaces is an end surface 25a for limiting movement of key 14a in hole 25. Hole 26 also has a similar end surface 26a for limiting movement of key 14a in hole 26. In the embodiment of FIG. 15, when key 14a abuts against end surface 25a of hole 25, key 14a is disposed at angle A2 so as to set swash plate 11c for minimizing the displacement of corresponding motor 11A or 11B.

By changing the angle of boss portion 15a relative to control shaft 14, shaft holder 15 can adjust angle A2 of key 14a of control shaft 14 so as to adjust the minimum displacement of corresponding motor 11A or 11B. In this regard, as shown in FIG. 15(a), a first slot 15d is bored in plate portion 15c of shaft holder 15. An eccentric bush 18b is passed through first slot 15d. Eccentric bush 18b has an eccentrically axial penetrating hole 18c through which screw shaft 18a is passed and screwed into casing 61 (lower casing part 61A). Screw shaft 18a is provided thereon with a nut, or formed at an outer end thereof into a bolt head, so as to be fastened to casing 61 together with eccentric bush 18b. By loosening shaft 18a from casing 61, eccentric bush 18b can be revolved around shaft 18a so as to revolve plate portion 15c around the axis of boss portion 15a and shaft 14, thereby changing the angle of boss portion 15a relative to control shaft 14, i.e., adjusting angle A2 of key 14a defining the minimum displacement of corresponding motor 11A or 11B.

Plate portion 15c of shaft holder 15 is also bored by a second slot 15e, through which screw shaft 17 (provided with a nut, or formed into a bolt) is passed and screwed into casing 61 (lower casing part 61A) so as to fasten plate portion 15c of shaft holder 15 adjusted in angle to casing 61. During the above adjusting of angle A2 of key 14a, screw shaft 17 fixed to casing 61 relatively moves along second slot 15e so as to allow and guide the rotation of plate portion 15c.

The minimum displacement of each of motors 11A and 11B defines the maximum rotary speed of axles 19L and 19R on the assumption that the displacement of pump 33 and the rotary speed of pump shaft 30p are constant. Due to the above construction, the minimum displacement of motor 11A or 11B can be adjusted so as to adjust the maximum rotary speed of axles 19L and 19R to an optimal value for preventing drive wheels provided on axles 19L and 19R from dragging on a turf, or for ensuring an optimal difference of rotary speed between front and rear drive wheels for turning of vehicle 1.

The rotational direction of control shaft 14 and swash plate 11c for reducing the displacement of corresponding motor 11A or 11B may be set opposite to that of FIG. 15, in correspondence to such a situation that the relation of rotational direction of axles 19L and 19R to the flow direction of hydraulic fluid through corresponding motor 11A or 11B is reversed, i.e., that the flow direction of hydraulic fluid through motor 11A or 11B is opposite to that of FIG. 15 while the rotational direction of axles 19L and 19R is the same as that of FIG. 15. In this state, shaft holder 15 is arranged so as to insert key 14a of control shaft 14 into hole 26 opposite to hole 25 with respect to the axis of shaft 14, as shown in FIG. 16.

Figure 16:
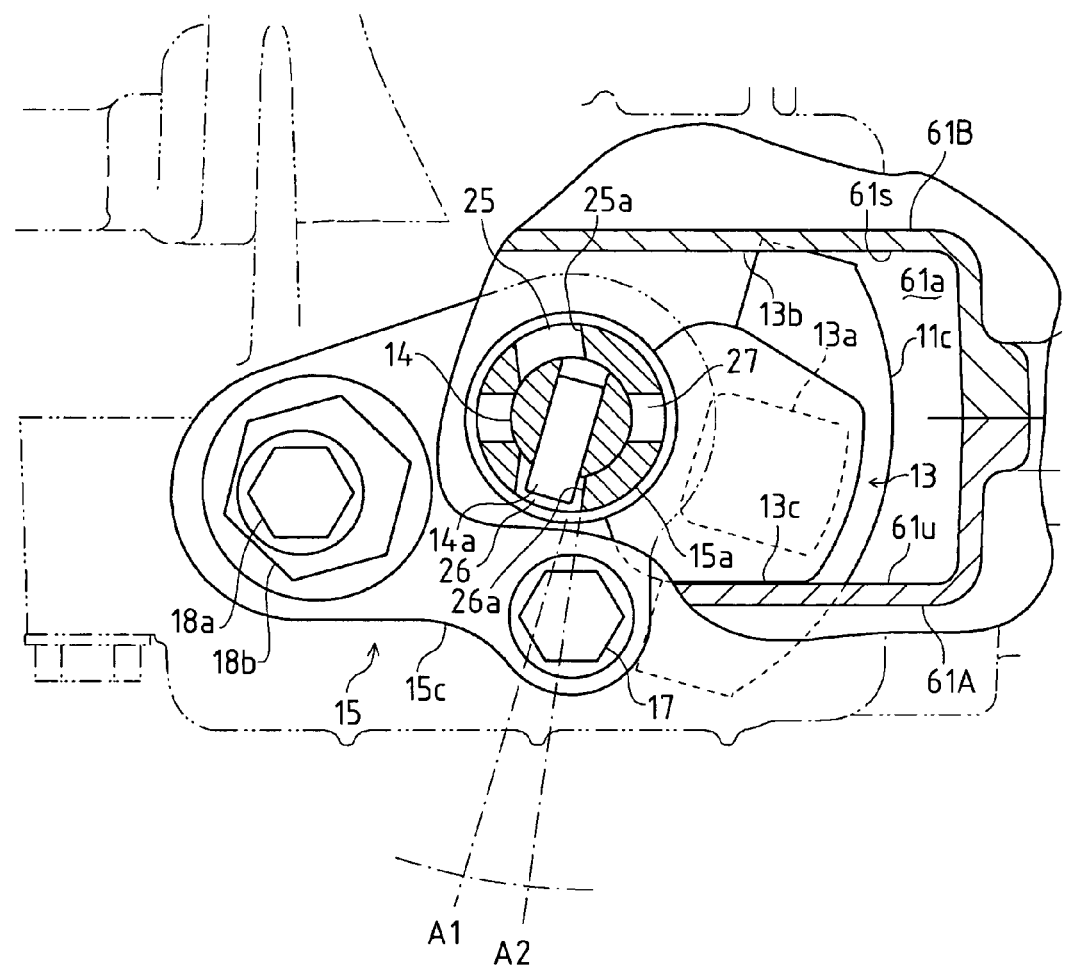
FIG. 16 is a similar view of transaxle 10A (or 10B) showing the above mechanism having shaft holder 15 arranged corresponding to movable swash plate 11c whose rotational direction relative to hydraulic fluid flow direction is opposite to that of FIG. 15.

In the arrangement of shaft holder 15 as shown in FIG. 16, when key 14a abuts against end surface 26a of hole 26, key 14a is disposed at angle A2 so as to set swash plate 11c for minimizing the displacement of corresponding motor 11A or 11B. Furthermore, when lower end surface 13c of control arm 13 abuts against inner horizontal surface 61u of lower casing part 61A upwardly facing to motor chamber 61a, key 14a is disposed at angle A1 so as to set swash plate 11c for maximizing the displacement of corresponding motor 11A or 11B.

Figure 17:
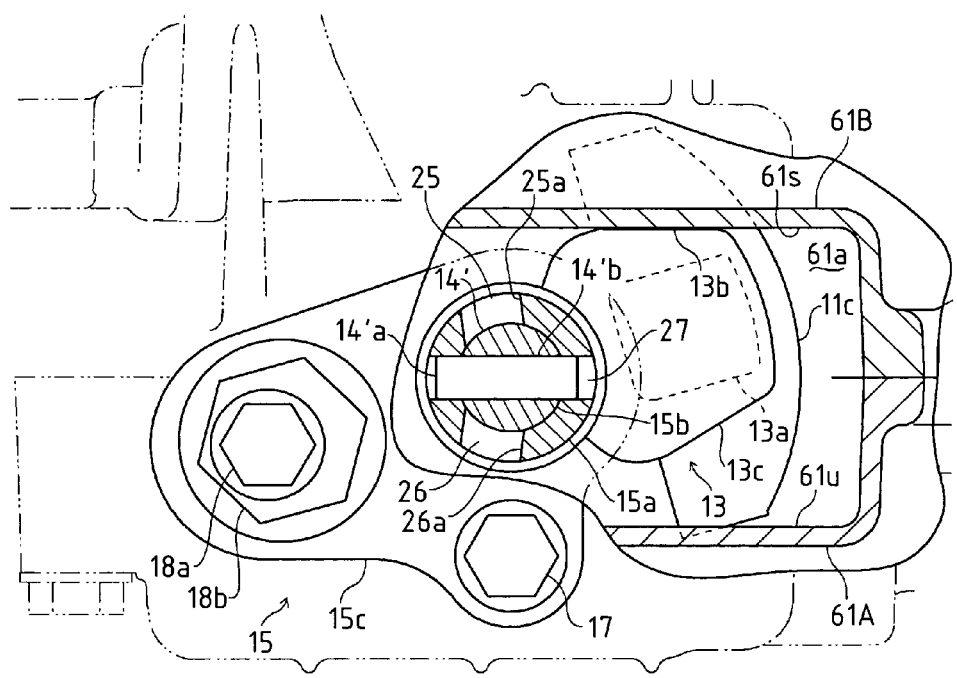
FIG. 17 is a similar view of transaxle 10A (or 10B) showing the above mechanism having shaft holder 15 arranged for fixing swash plate 11c so as to fix the displacement of corresponding hydraulic motor 11A (or 11B).

Referring to FIG. 17, shaft holder 15 can also hold a control shaft 14' replacing control shaft 14 to be immovable so as to fix swash plate 11c, i.e., set corresponding motor 11A or 11B into the fixed displacement type. Control shaft 14' has a diametrical key groove 14'b in which a diametrically penetrating key 14'a is fitted. In this regard, as shown in FIGS. 15 to 17, a pair of opposite radial holes 27 for fitting key 14'a therein are bored in boss portion 15a of shaft holder 15, and extended from axial penetrating hole 15b substantially perpendicularly to holes 25 and 26. Holes 27 are so narrow as to tighten key 14'a inserted therein, thereby preventing control shaft 14' from rotating. Key 14'a of control shaft 14' is so arranged as to be tightly fitted into both holes 27, as shown in FIG. 17.

Even in this state, by loosening shaft 17 and revolving eccentric sleeve 18b around rotary axial shaft 18a, boss portion 15a can be rotated so as to adjust the fixed angle of swash plate 11c.

To sum up, each of transaxles 10A and 10B incorporates corresponding variable displacement hydraulic motor 11A or 11B provided with means for determining a tilt angle range of a movable swash plate thereof, wherein the means can also change the movable swash plate into a fixed swash plate, that is, change the variable displacement hydraulic motor into a fixed displacement hydraulic motor. Namely, each of transaxles 10A and 10B uses the common means for adjusting the displacement of corresponding motor 11A or 11B whether the displacement is set variable or constant, thereby being applicable to various type vehicles.

In a vehicle having a turning center shifted lengthwise from the middle point between its front wheels and rear wheels, front and rear transaxles 10A and 10B are preferably provided with respective hydraulic motors 11A and 11B one of which is a variable displacement type, and the other of which is a fixed displacement type, so that the variable motor displacement defining its rotary speed can be changed to prevent dragging of grounding wheels during turning of the vehicle.

For example, in working vehicle 1 as show in FIG. 1, preferably, hydraulic motor 11A of front transaxle 10A for driving steerable wheels is set into a variable displacement type, and hydraulic motor 11B of rear transaxle 10B for driving unsteerable wheels is set into a fixed displacement type. During turning of vehicle 1, the turning center of vehicle 1 is disposed on the cross point between the axial extension line of axles 19L and 19R of rear transaxle 10B and that of axles 19L and 19R of front transaxle 10A so that the steerable wheels supported by front transaxle 10A are further distant from the turning center than the unsteerable wheels supported by rear transaxle 10B. Considering this situation, preferably, hydraulic motor 11A of transaxle 10A is set so as to reduce its displacement, i.e., increase its output rotary speed, according to turning of the vehicle, thereby preventing dragging of the steerable wheels. In this case, transaxle 10A has shaft holder 15 rotatably holding control shaft 14, whose key 14a in hole 25 or 26 is normally disposed at angle A1 when the vehicle travels straight, and turned to angle A2 during turning of the vehicle. Transaxle 10B has shaft holder 15 holding control shaft 14, whose key 14a is tightened in holes 27.

Figure 22:
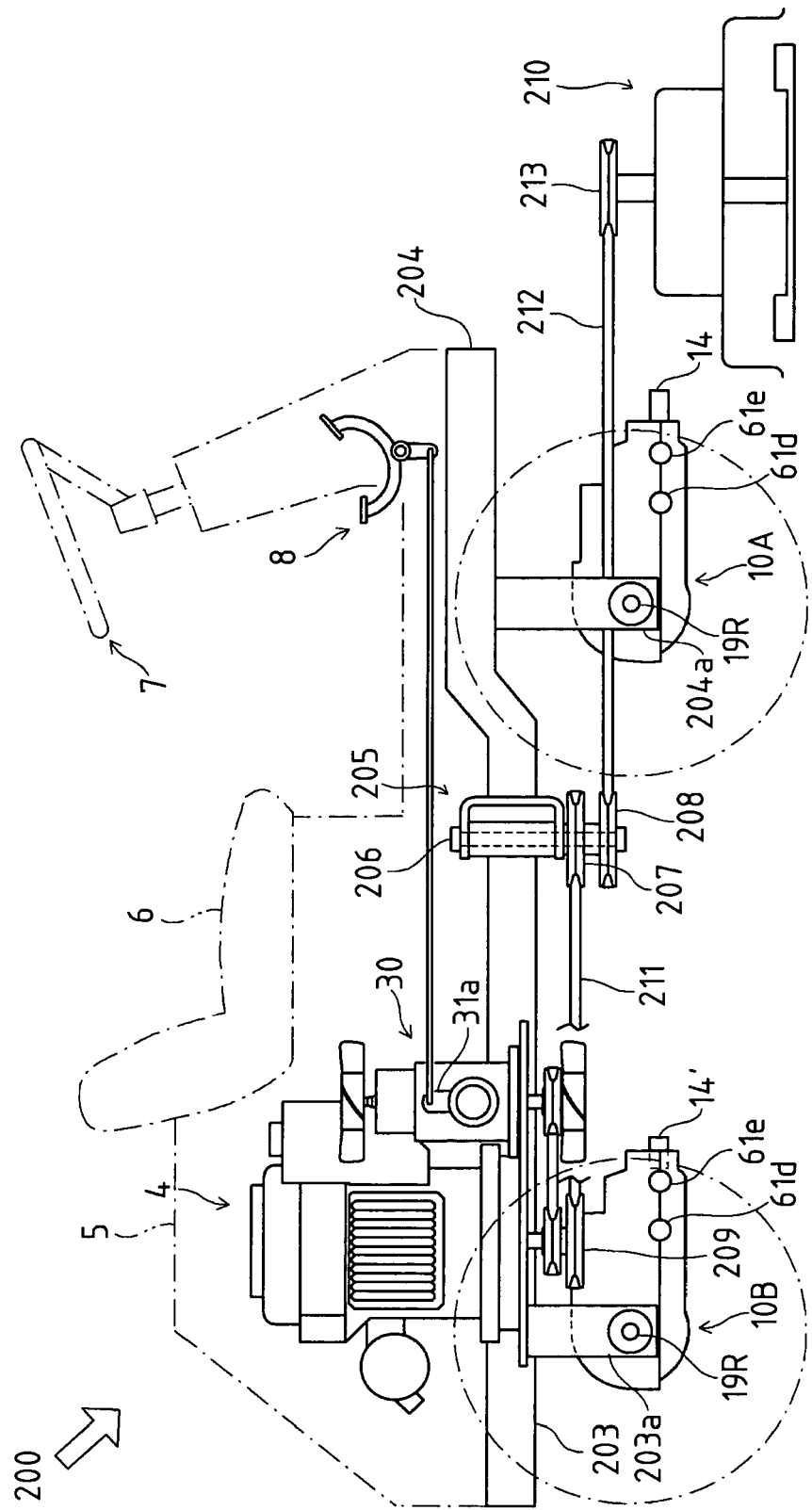
FIG. 22 is a schematic side view of an articulate working vehicle 200 according to the present invention.
Figure 23:
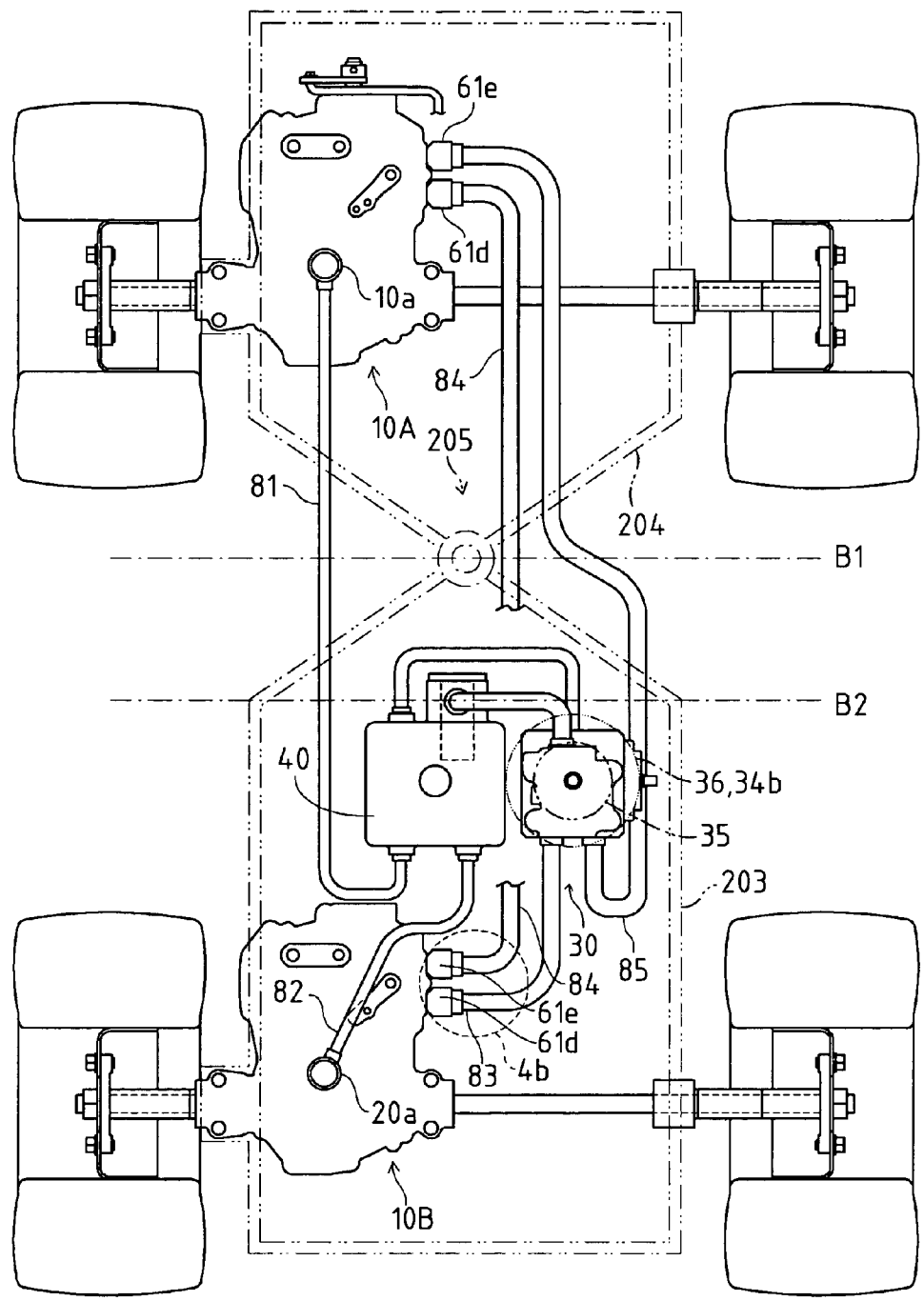
FIG. 23 is a schematic plan view of vehicle 200 showing a hydraulic circuit system with piping for driving vehicle 200 (the shown piping is so rearranged for convenience as to be different from its actual plan view).

An articulated working vehicle 200 as shown in FIGS. 22 and 23 comprises a rear frame 203 and a front frame 204 mutually flexibly connected via a coupling 205. Transaxle 10A is mounted on front frame 204, and transaxle 10B on rear frame 203. Coupling 205 (more specifically, a line B1 passing the vertical axial center of coupling 205) is shifted forward from a middle line B2 between the axial center line of axles 19L and 19R of transaxle 10A and the axial center line of axles 19L and 19R of transaxle 10B, i.e., coupling 205 is eccentrically disposed toward the axial center line of axles 19L and 19R of transaxle 10A. Therefore, as the turning angle of vehicle 200 increases, tires supported by front transaxle 10A are further distant from the turning center of vehicle 200 than tires supported by rear transaxle 10B. Correspondingly, it is requested that either or both of hydraulic motors 11A and 11B of respective transaxles 10A and 10B are set into the variable displacement type so that the tires of transaxle 10A can increase their rotary speed faster than the tires of rear transaxle 10B according to increase of the turning angle of vehicle 200. For example, hydraulic motor 11A of transaxle 10A on front frame 204 is set into the variable displacement type, and hydraulic motor 11B of transaxle 10B on rear frame 203 is set into the fixed displacement type. During turning of vehicle 200, hydraulic motor 11A is reduced in displacement for increasing its output rotary speed according to increase of the turning angle of vehicle 200, thereby preventing dragging of tires.

Alternatively, if coupling 205 of articulated vehicle 200 is shifted backward (toward the axial center line of axles 19L and 19R of rear transaxle 10B) from middle line B2, hydraulic motor 11A of front transaxle 10A is set in the variable displacement type, and hydraulic motor 11B of rear transaxle 10B is set in the fixed displacement type. In this case, it is considerable that hydraulic motor 11A of front transaxle 10A is increased in displacement for reducing its output rotary speed. Alternatively, if articulated vehicle 200 has coupling 205 on middle line B2, i.e., such that no difference of rotary speed between the front tires and the rear tires is required during turning, it may be considered that both hydraulic motors 11A and 11B of respective transaxles 10A and 10B are set in the fixed displacement type.

A mechanism of supporting transaxle 10A at a front portion of chassis 3 of vehicle 1 will be described in accordance with FIGS. 18 to 21. Incidentally, as discussed later, FIGS. 18 to 21 show guide plate 151 guiding control lever 23 instead of shaft holder 15 holding control shaft 14.

Figure 18:
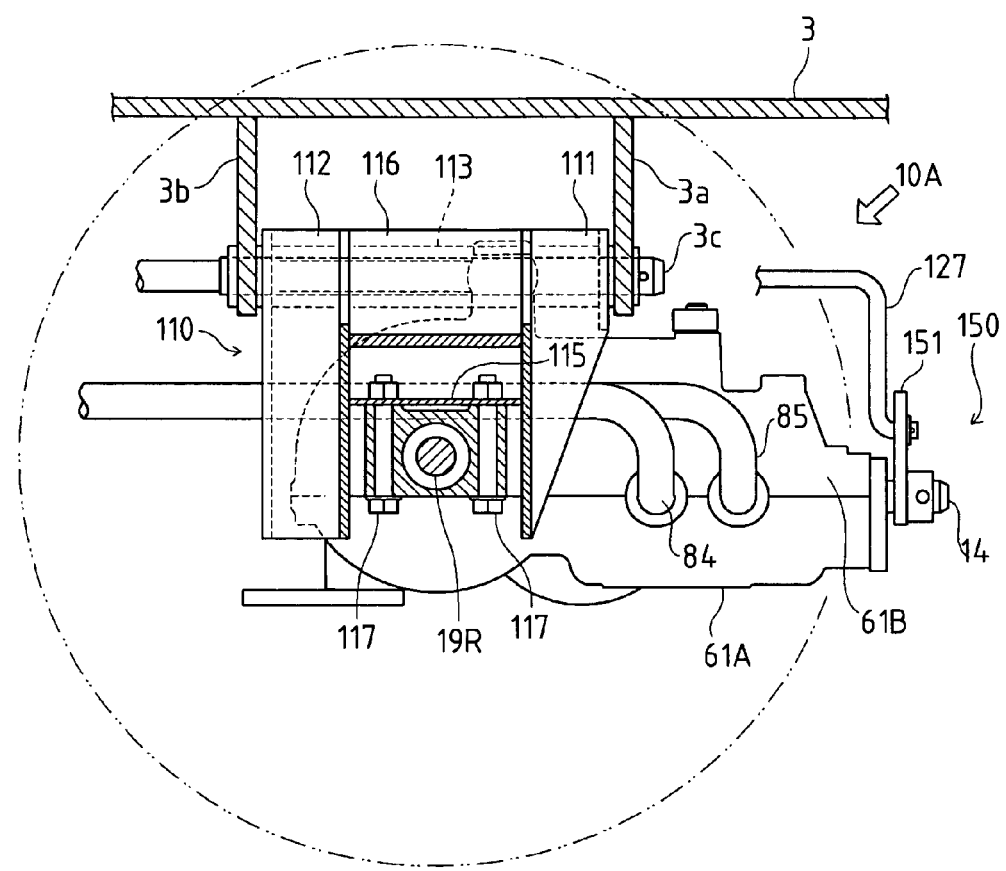
FIG. 18 is an enlarged sectional side view of a portion of vehicle 1 including a mechanism of supporting transaxle 10A to a chassis 3.
Figure 19:
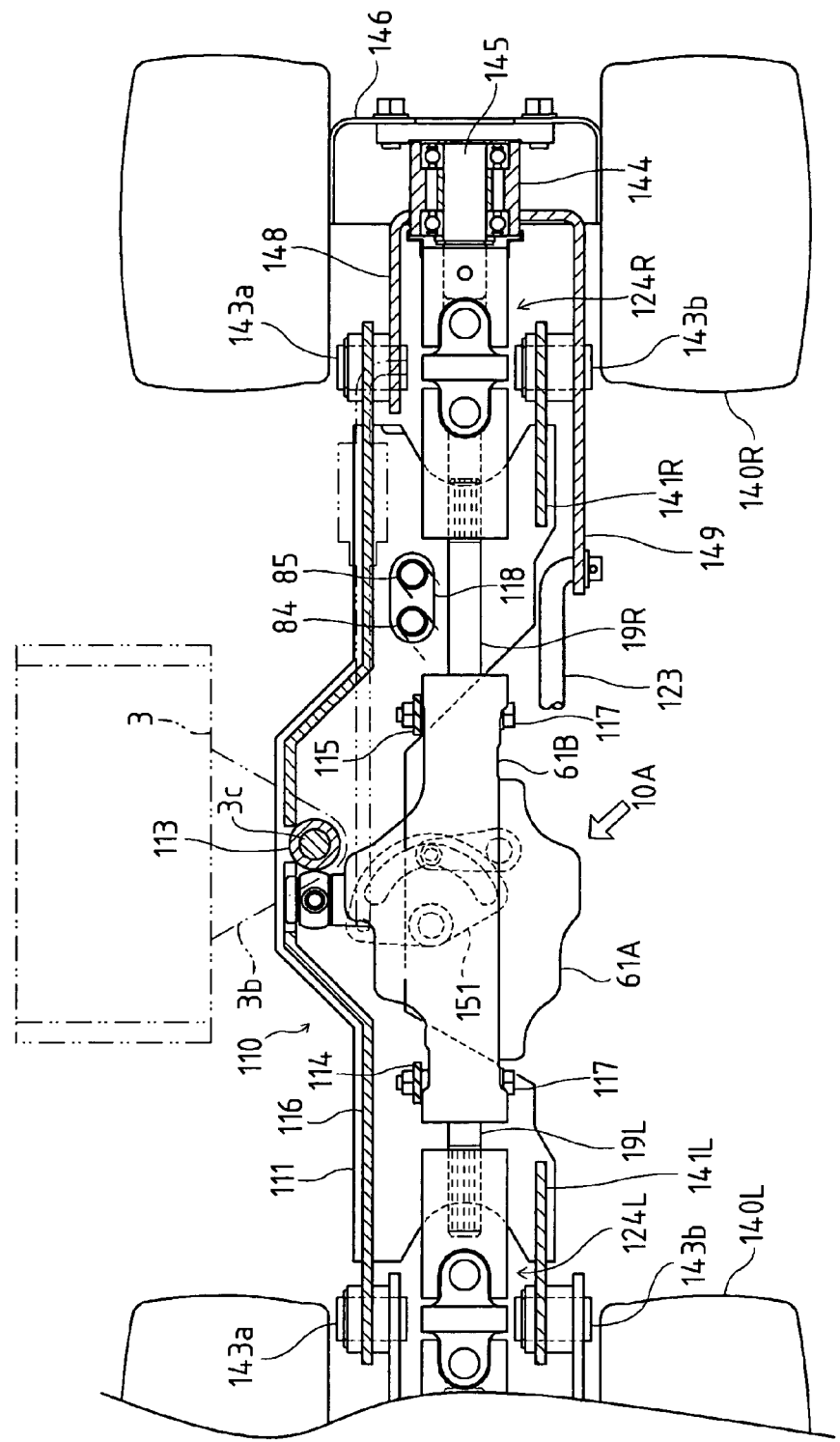
FIG. 19 is an enlarged sectional rear view of the portion of vehicle 1 shown in FIG. 18.
Figure 20:
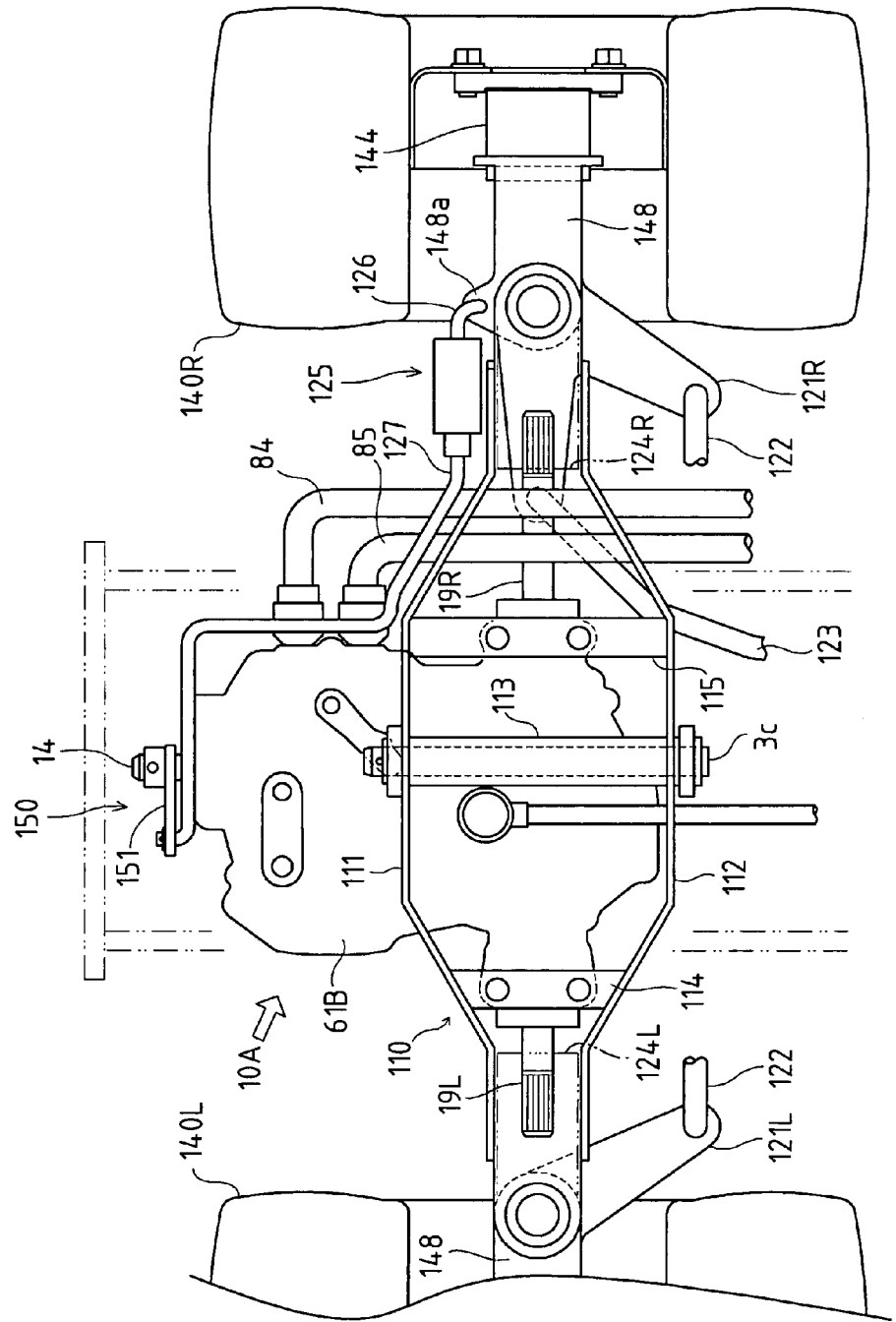
FIG. 20 is an enlarged plan view of the portion of vehicle 1 shown in FIG. 18.

Referring to FIGS. 18 and 19, a front bracket plate 3a and a rear bracket plate 3b are hung down from chassis 3 so as to pivotally support a center pin 3c extended in the longitudinal direction of vehicle 1. A support frame 110 is pivoted at an upper portion thereof on center pin 3c between bracket plates 3a and 3b. As shown in FIG. 20, support frame 110 includes a pair of vertical front and rear plates 111 and 112, each of which is bent into a substantially trapezoidal shape when viewed in plan. A horizontal sleeve 113 relatively rotatably penetrated by center pin 3c is extended in the longitudinal direction of vehicle 1 so as to connect plates 111 and 112 to each other. A pair of left and right substantially horizontal plates 114 and 115 are extended in the longitudinal direction of vehicle 1 so as to connect plates 111 and 112 to each other. A substantially horizontal upper plate 116 bent into different levels is extended along upper edges of plates 111 and 112 so as to cover the space between plates 111 and 112 therebelow, as best shown in FIG. 19.

As shown in FIGS. 18 to 20, upper casing part 61B of casing 61 of transaxle 10A is formed with left and right axle housing portions for supporting respective axles 19L and 19R, which are fitted at top surfaces thereof to lower surfaces of plates 114 and 115, and fastened to plates 114 and 115 by bolts 117, respectively.

As shown in FIGS. 19 to 21, front and rear plates 111 and 112 are bored by holes 118 through which pipes 84 and 85 can be passed.

As shown in FIG. 19, left and right tires 140L and 140R are laterally rotatably supported onto left and right ends of support frame 110, respectively. Each of tires 140L and 140R is provided with a pair of upper and lower substantially vertical and coaxial king pins 143a and 143b. Upper king pins 143a are supported by respective left and right ends of upper plate 116 projecting laterally outward from left and right ends of plates 111 and 112. Left and right substantially horizontal plates 141L and 141R are extended between left and right lower edges of plates 111 and 112, and project laterally outward from the left and right ends of plate 111 and 112 so as to support respective lower king pins 143b.

A bearing casing 144 fixedly penetrates a vertical plate portion of a bracket 148, which is bent to have upper and lower substantially horizontal plate portions. The upper and lower substantially horizontal plate portions of each bracket 148 are extended laterally inward, so that the upper plate portion is pivotally connected to upper plate 116 via upper king pin 143a, and the lower plate portion to each of plates 141L and 141R via lower king pin 143b.

Each of tires 140L and 140R is provided on the periphery of a wheel (or rim) 146, to which an axial center shaft 145 is fixed. Axial center shafts 145 of tires 140L and 140R rotatably penetrate bearing casings 144 to be pivotally connected to axles 19L and 19R via universal joints 124L and 124R disposed between upper and lower king pins 143a and 143b, respectively. In this way, left and right tires 140L and 140R are laterally rotatably and drivingly connected to respective axles 19L and 19R of transaxle 10A.

As shown in FIGS. 19 and 20, the substantially horizontal lower plate portion of right bracket 148 provided to right tire 140R is extended laterally inward from king pin 143b so as to serve as a stay 149 pivotally connected to one end of a link rod 123 operatively connected to steering wheel 7. As shown in FIG. 20, tires 140L and 140R are provided with respective arms 121L and 121R horizontally rotatably pivoted on either king pins 143a or 143b. A tie rod 122 is pivotally interposed between arms 121L and 121R. Due to this construction, both tires 141L and 141R are laterally turned by rotating steering wheel 7.

As shown in FIGS. 20 to 21, right bracket 148 has a forward projection 148a operatively connected to control shaft 14 serving as the rotary axis of swash plate 11c of motor 11A in transaxle 10A. Therefore, the displacement of motor 11A is changed according to detection of lateral turning of tires 140L and 140R.

As shown in FIG. 21, control lever 23 is fixed on horizontal control shaft 14 pivotally supported by casing 61 of transaxle 10A, so as to be vertically rotatable together with control shaft 14. A lever guide mechanism 150 is provided for guiding rotation of lever 23 according to movement of link rods 126 and 127 extended from forward projection 148a of bracket 148.

Lever guide mechanism 150 comprises a vertical cam plate 151 pivoted to casing 61 (upper casing part 61B) via a horizontal pivot shaft 152. As shown in FIG. 21, cam plate 151 is fan-shaped when viewed in front, formed with a substantially arcuate guide slot 151a along its arcuate edge. In guide slot 151a, a center portion thereof is most distant from pivot shaft 152. As going to each of upper and lower ends of slot 151a from the center portion, the distance between slot 151a and pivot shaft 152 decreases.

Cam plate 151 has a joint point 151b adjacent to the upper end of guide slot 151a so as to join with an end of link rod 127.

A horizontal collar 23a is relatively rotatably provided on a tip of control lever 23 and slidably rotatably fitted into guide slot 151a. When vehicle 1 travels straight (tires 140L and 140R are oriented in the forward and backward direction of vehicle 1), collar 23a is disposed at the center portion of guide slot 151a evenly distant from both the upper and lower ends thereof.

Whether vehicle 1 turns left or right, link rods 126 and 127 interposed between bracket 148 of right tire 140R and cam plate 151 is pushed or pulled so as to rotate cam plate 151 around pivot shaft 152, whereby collar 23a approaches either the upper or lower end of guide slot 151a. Collar 23a approaching either the upper and lower end of guide slot 151a approaches pivot shaft 152 because of the above-mentioned reduction of distance between guide slot 151a and pivot shaft 152, thereby rotating the tip of control lever 23 toward pivot shaft 152. If this rotational direction of lever 23 corresponds to the rotational direction of swash plate 11c for reduction of the displacement of motor 11A, tires 140L and 140R of transaxle 10A are accelerated according to increase of their left or right turning angle.

As shown in FIG. 21, an expansion joint 125 is interposed between link rod 126 joined to front projection 148a of bracket 148 and link rod 127 joined to cam plate 151. Expansion joint 125 is provided for allowing the turning of tires 140L and 140R after control lever 23, i.e., swash plate 11c reaches its rotational limit position if the turning range of tires 140L and 140R exceeds that of control lever 23. Expansion joint 125 comprises a casing 125a incorporating a spring 125b. Link rod 126 extended from projection 148a is screwed into one end of casing 125a, and link rod 127 extended from cam plate 151 is axially slidably inserted into casing 125a through the other end of casing 125a.

In casing 125a, spring 125b is disposed between slide retainers 127a and 127b axially slidably provided on link rod 127. Slide retainer 127a is nearer to link rod 126 than slide retainer 127b. A stopper pin 127e is radially inserted into an end portion of link rod 127 so as to prevent slide retainer 127a from excessively moving on link rod 127 toward link rod 126. A washer 127d is provided on link rod 127 between stopper pin 127e and slide retainer 127a. A retaining ring 125c is fixedly provided on the inner periphery of casing 125a so as to prevent slide retainer 127a from excessively moving toward link rod 126, i.e., limit the movement of casing 125a relative to link rod 127 toward cam plate 151.

In casing 125a, link rod 127 has a diametric difference, and a washer 127c is disposed on link rod 127 between the diametric difference and slide retainer 127b. The diametric difference of link rod 127 prevents slide retainer 127b with washer 127c from excessively moving on link rod 127 away from link rod 126. The end surface of casing 125a passing link rod 127 therethrough prevents flange retainer 127b from excessively moving away from link rod 126, i.e., limits the movement of casing 125a relative to link rod 127 away from cam plate 151.

If the whole left and right turning range of tires 140L and 140R is ensured during the whole rotation of swash plate 11c, spring 125b may be unused. However, it may happen that the rotatable range of swash plate 11c is unexpectedly reduced by dimensional error so that swash plate 11c reaches its limit angle before the turning of tires 140L and 140R reaches the limit. When control lever 23 is stopped by swash plate 11c reaching the limit angle, link rod 127 and cam plate 151 stop. However, tires 140L and 140R can still turn while control lever 23 stops, because casing 125a connected to bracket 148 via link rod 126 allows relative axial movement of link rod 127 therein.

If tires 140L and 140R are going to turn left after stopping of control lever 23, casing 125a slides toward cam plate 151 relative to link rod 127 so as to allow the further left turning of tires 140L and 140R. Casing 125a sliding toward cam plate 151 along link rod 127 pushes slide retainer 127a toward slide retainer 127b retained by the diametric difference of link rod 127, thereby compressing spring 125b so as to resist the left turning of tires 140L and 140R while control lever 23 and swash plate 11c are stopped.

If tires 140L and 140R are going to turn right after stopping of control lever 23, casing 125a slides away from cam plate 151 relative to link rod 127 so as to allow the further right turning of tires 140L and 140R. Casing 125a sliding away from cam plate 151 along link rod 127 pushes slide retainer 127b toward slide retainer 127a retained by retaining ring 125c, thereby compressing spring 125b so as to resist the right turning of tires 140L and 140R while control lever 23 and swash plate 11c are stopped.

Articulated working vehicle 200 as shown in FIGS. 22 and 23 comprises rear frame 203 and front frame 204 flexibly coupled to each other through coupling 205. Rear frame 203 supports engine 4, pump unit 30, reservoir tank 40 and transaxle 10B, and front frame 204 supports transaxle 10A. Similar to vehicle 1, the hydraulic circuit for circulating hydraulic fluid among hydraulic pump 33 and motors 11A and 11B is constructed by piping of pipes 81, 82 and so on among pump unit 30, transaxles 10A and 10B and reservoir tank 40 (the piping is omitted in FIG. 22).

Each of front and rear transaxles 10A and 10B is laterally eccentrically disposed in vehicle 1 so that left and right axles 19L and 19R projecting laterally outward therefrom are different in length from each other. Left and right brackets 203a and 204a holding respective bearings are hung down from rear frame 203 and front frame 204 so as to journal respective axles 19L and 19R through the respective bearings adjacent to front and rear tires on outer ends of axles 19L and 19R.

In FIGS. 22 and 23, pump unit 30 incorporating hydraulic pump 33 having vertical pump shaft 30p and a reservoir tank 40 are laterally juxtaposed on rear frame 203 and disposed between front and rear transaxles 10A and 10B. However, any place in vehicle 200 and any direction are allowed for arranging pump unit 30 if pump unit 30 can be drivingly connected to engine 4 properly, similarly to vehicle 1. For example, pump unit 30 may alternatively be disposed before front transaxle 10A or behind rear transaxle 10B. Alternatively, pump unit 30 may be disposed over or below the longer one of axles 19L and 19R of either rear transaxle 10B or front transaxle 10A so that pump unit 30 and either rear transaxle 10B or front transaxle 10A are laterally juxtaposed between left and right brackets 203a or 204a. Alternatively, pump unit 30 may be disposed to orient pump shaft 30p horizontally. Further, other place and height than the illustrated may be allowed for arranging reservoir tank 40 because of the same reason in the description of vehicle 1.

In coupling 205, a vertical pivot shaft 206 is rotatably supported by frames 203 and 204. A pair of upper and lower pulleys 207 and 208 are fixed on a lower portion of pivot shaft 206. A belt 211 is interposed between pulley 207 and a pulley 209 fixed on the vertical output shaft of engine 4, and a belt 212 is interposed between pulley 208 and a pulley 213 fixed on a vertical input shaft of mower 210, thereby transmitting engine power to mower 210.

Referring to FIG. 23, considering that articulation of vehicle 200 via coupling 205 changes distances among pump unit 30 and transaxles 10A and 10B, pipes 81, 84 and 85 for connecting pump unit 30 and transaxles 10A and 10B to one another are made of elastic material, such as rubber. Alternatively, each of pipes 81, 84 and 85 may be combination of a rubber pipe and a metal pipe facilitating effective radiation.

Referring to FIG. 23, as mentioned above, line B1 passing the axial center of coupling 205 is shifted forward from the above-mentioned middle line B2 of vehicle 200 so that, as vehicle 200 turns, the distance of drive wheels of transaxle 10A from a turning center of vehicle 200 becomes larger than that of transaxle 10B. Therefore, as mentioned above, during turning of vehicle 200, the displacement of motor 11A in transaxle 10A is reduced so as to increase the wheel speed of the drive wheels (tires 140L and 140R) of transaxle 10A to a value larger than that of the drive wheels of transaxle 10B, thereby preventing dragging of the drive wheels of transaxle 10A. The same is true about vehicle 1. That is, each of vehicle 1 having the steerable front wheels and the unsteerable rear wheels and articulate vehicle 200 having the forwardly shifted articulation pivot requires acceleration of the front wheels driven by front transaxle 10A during turning of the vehicle.

Referring to FIG. 24, two patterns S1 and S2 about setting front and rear transaxles 10A and 10B are provided for vehicles 1 and 200 considering such a necessity of accelerating the drive wheels of front transaxle 10A during turning of the vehicle. Whether transaxles 10A and 10B may be set in pattern S1 or S2, a wheel speed D1 or D2 of the drive wheels of transaxle 10A is equal to a wheel speed D3 of the drive wheels of transaxle 10B during straight traveling of the vehicle, and wheel speed D1 or D2 of the drive wheels of transaxle 10A becomes larger than wheel speed D3 of the drive wheels of transaxle 10B during turning of the vehicle.

Conventional setting pattern S1 is established when front and rear transaxles 10A and 10B are essentially standardized excluding that front hydraulic motor 11A is variable in displacement and hydraulic motor 11B is fixed in displacement. The deceleration gearing interposed between motor shaft 11a and axles 19L and 19R in front transaxle 10A is the same with that in rear transaxle 10B so that a gear reduction ratio G1 of transaxle 10A for changing a motor shaft speed R1 into wheel speed D1 is equal to a gear reduction ratio G3 of transaxle 10B for changing a motor shaft speed R3 into wheel speed D3.

In the arrangement in each of transaxles 10A and 10B, as shown in FIG. 9, motor gear 11d on motor shaft 11a, intermediate gear 62, bull gear 72, pinions 73 and differential side gears 74L and 74R are determined in number of teeth thereof so as to determine each of gear reduction ratios G1 and G3. In other words, increase of gear reduction ratio means increase of gear teeth of the deceleration gearing.

Corresponding to the equality of gear reduction ratios G1 and G3, motor shaft speed R1 of transaxle 10A (the rotary speed of motor shaft 11a of hydraulic motor 11A) must be equal to motor shaft speed R3 (the rotary speed of motor shaft 11a of hydraulic motor 11B) of transaxle 10B during straight traveling of the vehicle. It means that a motor displacement R1 of transaxle 10A (the variable displacement of hydraulic motor 11A) must be equal to a motor displacement R3 of transaxle 10B (the fixed displacement of hydraulic motor 11B) during straight traveling of the vehicle.

A problem of conventional setting pattern S1 arises during turning of the vehicle. As mentioned above, wheel speed D1 of transaxle 10A must be increased to a value larger than wheel speed D3 of transaxle 10B during turning of the vehicle, so that movable swash plate 11c of hydraulic motor 11A must be moved to reduce variable motor displacement M1 of transaxle 10A to a value smaller than constant motor displacement M3 of transaxle 10B so as to increase motor shaft speed R1 of transaxle 10A to a value larger than constant motor shaft speed R3 of transaxle 10B. Increase of motor shaft speed M1 means acceleration of the deceleration gearing of transaxle 10A. However, the deceleration gearing is standardized in its gear teeth count or the like so as to correspond to transaxle 10B having fixed displacement hydraulic motor 11B. In other words, the deceleration gearing is not standardized in anticipation of increase of the motor shaft speed. If such a deceleration gearing is accelerated by increase of the motor shaft speed, unexpectedly large noise is possibly generated.

Setting pattern S2 is presented for solving the problem of conventional setting pattern S1. In setting pattern S2, transaxle 10A has a motor displacement M2 larger than fixed motor displacement M3 of transaxle 10B during straight traveling of the vehicle, so that motor shaft speed R2 of transaxle 10A is smaller than motor shaft speed R3 of transaxle 10B during straight traveling of the vehicle. Correspondingly, transaxle 10A is provided with a deceleration gearing having gear reduction ratio G2 smaller than gear reduction ratio G3 of the deceleration gearing of transaxle 10B so as to equalize its wheel speed D2 to wheel speed D3 of transaxle 10B during straight traveling of the vehicle.

During turning of the vehicle, transaxle 10A reduces its motor displacement M2 so as to increase its motor shaft speed R2, thereby increasing its wheel speed D2 to a value larger than wheel speed D3 of transaxle 10B. Even if reduced motor displacement M2 reaches a value not more than fixed motor displacement M3 of transaxle 10B so that motor shaft speed R2 reaches a value not less than motor shaft speed R3 of transaxle 10B, noise generated from the deceleration gearing of transaxle 10A accelerated by the increase of motor shaft speed R2 is still suppressed to an acceptable value because of its small gear reduction ratio G2 (smaller than gear reduction ratio G3 of transaxle 10B). Consequently, vehicle 1 or 200 having transaxles 10A and 10B set in pattern S2 can turn under the suppressed noise condition.

Incidentally, to make motor displacement M2 larger than motor displacement M3 during straight traveling of the vehicle, transaxle 10A may have hydraulic motor 11A having its internal displacement (defined by its essential cylinder volume or so on) larger than the internal displacement of hydraulic motor 11B of transaxle 11B, or hydraulic motors 11A and 11B may have equal internal displacements, while movable swash plate 11c of hydraulic motor 11A is set to increase motor displacement M2 to the required level.

Figure 25:
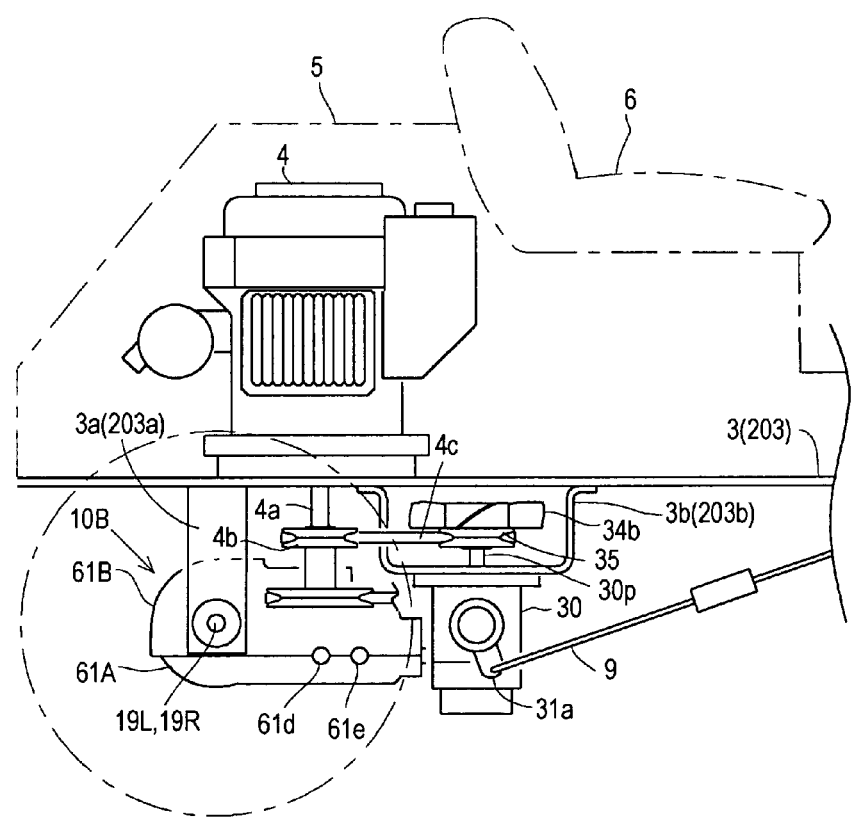
FIG. 25 is a side view of a principal portion of vehicle 1 or 200 showing alternatively arranged pump unit 30.

FIG. 25 illustrates alternative pump unit 30 disposed below chassis 3 of vehicle 3 or rear frame 203 of vehicle 200. A bracket 3b or 203b hung down from chassis 3 or rear frame 203 is a plate bent in a U-like shape when viewed in side. That is, bracket 3b (203b) has vertical front and rear portions and a lower horizontal portion between the vertical front and rear portions. Pump unit 30 is hung down from the horizontal portion of bracket 3b (203b). Pump unit 30 is vertically reversed in comparison with that of FIG. 1 (FIG. 22) so that charge pump 32 is disposed below hydraulic pump 33.

Pump shaft 30p projects upward from the horizontal portion of bracket 3b (203b). The portion of pump shaft 30p between chassis 3 (203) and the horizontal portion of bracket 3b (203b) below chassis 3 (rear frame 203) is fixedly provided thereon with cooling fan 34b and input pulley 35. Vertical output shaft 4a of engine 4 projects downward from chassis 3 (rear frame 203) adjacent to bracket 4b (203b) so as to be fixedly provided thereon with output pulley 4b which is tied with input pulley 35 by belt 4c. Cooling fan 34b blows cooling wind downward toward pump unit 30 therebelow, rear transaxle 10B adjacent to pump unit 30, and pipes disposed therearaound. Bracket 3b (203b) is open at both left and right sides thereof so as to expose cooling fan 34b to the open air, thereby supplying air to cooling fan 34b.

Although the invention has been described in its preferred from which a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A hydraulic driving vehicle comprising:
   a front transaxle and a rear transaxle, each incorporating a hydraulic motor;
   a pump unit separated from the front and rear transaxles, the pump unit incorporating a hydraulic pump having a pump shaft;
   a hydraulic circuit formed by piping among the pump unit and the front and rear transaxles so as to circulate hydraulic fluid among the hydraulic pump and the hydraulic motors;
   a reservoir tank of the hydraulic fluid connected to the hydraulic circuit by piping; and
   a first cooling fan drivingly connected to the pump shaft, the first cooling fan blowing air away from the pump unit, wherein at least one pipe for the piping of the hydraulic circuit and the reservoir tank passes an area blown by the first cooling fan.

2. The hydraulic driving vehicle as set forth in claim 1, wherein one of the front and rear transaxles is disposed so as to pass the area blown by the first cooling fan.

3. The hydraulic driving vehicle as set forth in claim 1, wherein the front and rear transaxles and the pump unit are connected through respective separate pipes to the reservoir tank so as to drain excessive fluid to the reservoir tank individually.

4. The hydraulic driving vehicle as set forth in claim 1, wherein at least one pipe for the piping of the hydraulic circuit and the reservoir tank is partly or entirely made of metal material.

5. The hydraulic driving vehicle as set forth in claim 1, further comprising:
   a hydraulic actuator driven by the hydraulic pump, wherein a pipe for piping the hydraulic actuator to the hydraulic circuit passes the area blown by the first cooling fan.

6. The hydraulic driving vehicle as set forth in claim 1, further comprising:
   a second cooling fan drivingly connected to the pump shaft and disposed opposite to the first cooling fan with respect to the hydraulic pump, the second cooling fan blowing air toward the pump unit, wherein at least one pipe for the piping of the hydraulic circuit and the reservoir tank passes an area blown by the second cooling fan.

7. The hydraulic driving vehicle as set forth in claim 6, wherein the front and rear transaxles and the pump unit are connected through respective separate pipes to the reservoir tank so as to drain excessive fluid to the reservoir tank individually.

8. The hydraulic driving vehicle as ser forth in claim 6, wherein at least one pipe for the piping of the hydraulic circuit and the reservoir tank is partly or entirely made of metal material.

9. The hydraulic driving vehicle as set forth in claim 6, further comprising:
   a hydraulic actuator driven by the hydraulic pump, wherein a pipe for piping the hydraulic actuator to the hydraulic circuit passes the area blown by the first or second cooling fan.

10. A hydraulic driving vehicle comprising:
    a front transaxle and a rear transaxle, each incorporating a hydraulic motor;
    a pump unit separated from the front and rear transaxles, the pump unit incorporating a hydraulic pump;
    a hydraulic circuit formed by piping between the pump unit and the front and rear transaxles so as to circulate hydraulic fluid among the hydraulic pump and the hydraulic motors; and
    a reservoir tank of the hydraulic fluid connected to the hydraulic circuit by piping, wherein the reservoir tank includes a plurality of separate ports connected to the respective front and rear transaxles and pump unit through respective separate pipes to the reservoir tank so as to drain excessive fluid to the so as to receive fluid drained from the respective front and rear transaxles and pump unit.

11. The hydraulic driving vehicle as ser forth in claim 10, wherein at least one pipe for the piping of the hydraulic circuit and the reservoir tank is partly or entirely made of metal material.

* * * * *